Feb. 13, 1962  E. I. WHITE  3,021,508
REMOTE CONTROL SYSTEMS
Filed March 20, 1959  9 Sheets-Sheet 1

INVENTOR.
Edgar Ian White
BY W. K. Stat
HIS ATTORNEY

Feb. 13, 1962 E. I. WHITE 3,021,508
REMOTE CONTROL SYSTEMS
Filed March 20, 1959 9 Sheets-Sheet 4

INVENTOR.
Edgar Ian White
BY W. L. Stout
HIS ATTORNEY though wellknown, it is to be noted

3,021,508
REMOTE CONTROL SYSTEMS
Edgar Ian White, London, England, assignor to Westinghouse Brake and Signal Company, Limited, London, England
Filed Mar. 20, 1959, Ser. No. 800,775
Claims priority, application Great Britain Mar. 24, 1958
8 Claims. (Cl. 340—163)

My invention relates to remote control systems. More particularly, my invention relates to remote control systems of the continuously scanning type by which control functions and indications of the condition of apparatus are transmitted between a control office and one or more remote station locations.

Remote control systems of the continuously scanning type are known in the prior art. The more recently developed systems of this type use electronic elements and circuit arrangements to increase their rate of operation. One such electronic remote control system is disclosed and described in the copending application for Letters Patent of the United States, Serial No. 710,718, filed January 23, 1958, by B. H. Grose and S. L. Hurst, for Remote Control Systems, this reference and the present application being of common ownership. Since some of the basic circuit arrangements of this prior system are used in the system of my invention, additional references will be made to this prior application from time to time as the present specification develops. In this prior system, as well as in other similar systems, counting chains consisting of electronic circuit elements are used to provide synchronization of the transmission and reception of controls and indications between the control location and the remote locations. Corresponding elements or stages of these counting chains are activated simultaneously at each location so that the control and indication functions assigned to such stages may effectively be connected to the communication channel at the same time to obtain the desired control and to indicate the existing condition of the remote apparatus.

In systems such as that disclosed in the prior Grose and Hurst application, the stepping of all counting chains is controlled from the central location commonly called the control office. This counting chain control is effective for the transmission of both control and indication functions. Since this system is electronic in nature, all transmissions are in the form of pulses of current of a selected carrier frequency. In addition, the stepping pulses originated at the office location are also transmitted to the remote locations by pulses of a different frequency carrier current. This results in different delay periods prior to the arrival of the stepping pulses and the function pulses of carrier current. Although well known, it is to be noted that pulse transmission delays are inherent in carrier transmission over any type of communication channel presently known. It is also to be noted that the transmission delay period varies according to the frequency of the carrier current, so that current pulses of different frequencies transmitted simultaneously from one location are received at different times at a remote location. Where this difference in delay periods is appreciable, it is necessary, in order that the operation of the counting chains is synchronized with function reception, that the remote counting chain begin stepping on a step pulse later than that on which the control office counting chain begins its stepping cycle. This delay in the initiation of stepping by the remote chain is for a period including a number of stepping pulses equivalent to the interval by which the transmission delay of the function pulses exceeds the stepping pulse delay. In such systems, obviously, the carrier current for the stepping pulses is selected at a frequency which will incur a lesser delay than that of the carrier current of the function pulses.

When the complete system includes the transmission of indication functions from the remote location to the office for recording, as does the present system and that of the previously mentioned copending application, transmission of such indication functions is generally controlled by the same counting chain elements at the remote location which function to receive the control functions from the office. Since the indication functions are subject to additional delay in the transmission between the station and the office, the delay in the reception of these indication functions behind the locally generated stepping pulses becomes even greater than the corresponding delay period at the station. This results from the fact that a round-trip delay time is involved which includes both the delay period associated with the transmission of the control function carrier pulses from the office to the station and the additional delay period associated with the transmission of the indication function carrier pulses back to the office. It is evident, therefore, that some means for compensating for such delay periods in order to insure the proper reception and recording of the control and indication functions in the operation of a complete remote control system of the continuously scanning type is required at all locations included in such a system.

Accordingly, it is an object of my invention to provide a delay compensation means for continuously scanning remote control systems.

It is also an object of my invention to provide a means for compensating for the difference in pulse transmission delay times between the transmission of stepping and function control pulses in a continuously scanning remote control system.

A further object of my invention is the provision of a continuously operating remote control system with pulse transmission delay compensation to permit operation over any type of communication channel.

Another object of my invention is to provide a continuously scanning remote control system for transmission of control and indication functions between an office and a station location with all stepping pulses originating at the office location, and delay compensation means for differences in the transmission times of the stepping pulses and the function pulses.

It is also an object of my invention to provide means within an all electronic, carrier current remote control system to compensate for the different pulse transmission delay times occurring in the transmission of carrier currents of different frequencies.

A further object of my invention is the provision of synchronizing means in a continuously scanning remote control system which will correctly phase the response of each stage of the counting chain at a receiving location in relation to the period during which the assigned characterizing transmission is received from the remote transmitting location.

Another object of my invention is the provision of delay compensation means for remote control systems which enable a correction of a portion of a stepping pulse period to assure a properly timed response at a receiving station for registering received functions.

Other objects, features and advantages of my invention will become apparent from the following specification when taken in connection with the accompanying drawings.

In practicing my invention, I provide a continuously scanning, coded remote control system of the carrier current type utilizing entirely electronic circuitry, preferably, as is illustrated, with transistors. Control and indication functions are transmitted by this remote control system in opposite directions between a control office and one or more remotely located stations, although, in the illustrated system, only a single station is shown. However, as will be understood by those skilled in the art, such single station systems may be expanded into multi-station systems in many ways. Specific examples of the expansion of the basic remote control system of my invention into a multi-station system is disclosed and described in co-pending continuation-in-part application for Letters Patent of the United States, Serial No. 815,647, filed May 25, 1959, by J. P. Coley, B. H. Grose, S. L. Hurst, and E. I. White, for Remote Control Systems, this copending application and the present application having a common assignee.

As in the systems of both reference copending applications, two carrier current frequencies are allocated for transmission of the functions in each direction. However, normally current of only one frequency of each pair is transmitted at any one time over the single communication channel connecting the office and, in the illustrated system, the single station. Each direction of transmission requires a counting chain at the transmitting and receiving ends. As will appear in detail later, in my system I provide at the office two counting chains, one for transmitting controls and the second for receiving indications, while at the station a single counting chain is utilized to control both the receiving and the transmitting of the various functions. All the counting chains are driven by a common master stepping generator located at the office. To control the counting chain at the station, the stepping pulses are transmitted over the single communication channel by an additional carrier current circuit for which is selected a fifth carrier frequency which differs from those selected for the transmission of the functions.

Each of the counting chains is driven in recurring counting cycles by the stepping pulses. To assure that stepping of a counting chain is synchronized with the delayed arrival of the transmitted functions, each counting chain starts a cycle of operation only after being conditioned for such operation by a synchronizing pulse. The office transmitter counting chain is excluded from such conditioning since there is no delay involved in the transmitting of control functions during the stepping of this particular chain. The synchronizing pulses are transmitted over the same carrier circuits as are the control and indication functions so that the delay inherent in the function transmission is identical with the delay experienced by the synchronizing pulse. Thus, for example, the station counting chain follows the stepping pulses received from the office over the aforementioned separate carrier circuit only after reception of a synchronizing pulse from the office location. Such a synchronizing pulse is transmitted at the end of each cycle of operation of the office transmitting chain over the control function carrier circuits. In addition, this synchronizing pulse also serves as the reset pulse for the station chain in a manner similar to that described for resetting action in the previously mentioned copending application Serial No. 710,718.

A similar operational cycle is followed for the transmission of the indication functions from the station to the office. It is to be remembered that the station counting chain controls the transmission of these indications at the same time as controlling the reception of the controls. Obviously, the operation of this station counting chain is delayed beyond the stepping action of the office transmitting chain. For this reason, a second counting chain is provided at the office to define the stepping periods for the reception of indications. Additional delay is experienced in transmitting the indication functions from the station to the office so that the operation of the office receiving chain must be suitably delayed beyond the corresponding operation of the transmitting chain. This is accomplished by permitting chain counting operation only after reception of a synchronizing pulse from the station to condition the receiving chain for operation. Again this synchronizing pulse is transmitted over the same carrier circuits as are the indication functions so that the delay experienced is identical. Also similar to station operation, this synchronizing pulse also acts as a reset pulse for the office receiving chain.

As described thus far, the system of my invention enables corrections to be made in the stepping operation of a counting chain to the extent of one or more whole step periods. However, the difference of delay in transmission of the stepping pulses and the pulses carrying the function transmissions may possibly be such that a correction only in whole step periods would bring the response of the counting chain to a character transmission so close to the start or finish of such a transmission that the response is indecisive. In order to achieve a closer compensation when the delay periods include some fraction of a stepping period, further modification of the stepping cycle is necessary. To achieve this operation, the basic supply of master stepping pulses is generated by the master stepping generator at a frequency which is an exact multiple of the desired stepping rate of each chain. These master stepping pulses at the higher frequency are then applied to each of the counting chains through a frequency divider or other type scaling circuit having a count-down ratio equal to the selected multiple at which the master pulses are generated. These frequency dividers control stepping pulse generator means which actually drive the associated counting chain one step for each cycle of operation of the corresponding frequency divider. As will appear in the specific illustration, the frequency dividers used may have a counting cycle equal to a portion of the selected multiplying factor of the stepping pulses in order that standard counting stage elements may be used in the system. In addition, the frequency divider associated with each counting chain other than the transmitter counting chain at the control office is adapted in response to the cycle synchronizing pulse to make only a brief selected count before emitting the next stepping pulse. This preselected short count insures that chain response to the reception of the functions occurs approximately midway during each function period of the received transmission.

As an alternate method to the use of frequency dividers and the supply of master stepping pulses generated at a higher frequency, the master stepping generator may generate the stepping pulses at the desired stepping rate. These pulses are then applied to each of the counting chains, except for the office transmitting counting chain, through the intermediary of a ring counter arrangement which is adjusted to perform one revolution for each stepping pulse. Such ring counters may be preset, in response to the cycle synchronizing pulses, to a pattern of conduction insuring the application of the stepping pulses to the associated chains in phase with the step periods and the delay period of the transmission functions.

I shall now describe the details of the system of my invention, following with a description of the operation of th system, both taken in connection with the accompanying drawings, and shall then point out the novel features thereof in the appended claims.

Referring to the drawings:

FIG. 1 thereof is a block diagram and schematic chart, in more detail than the office portion of FIG. 9, illustrating the apparatus and operation at the office location.

Figure 7:
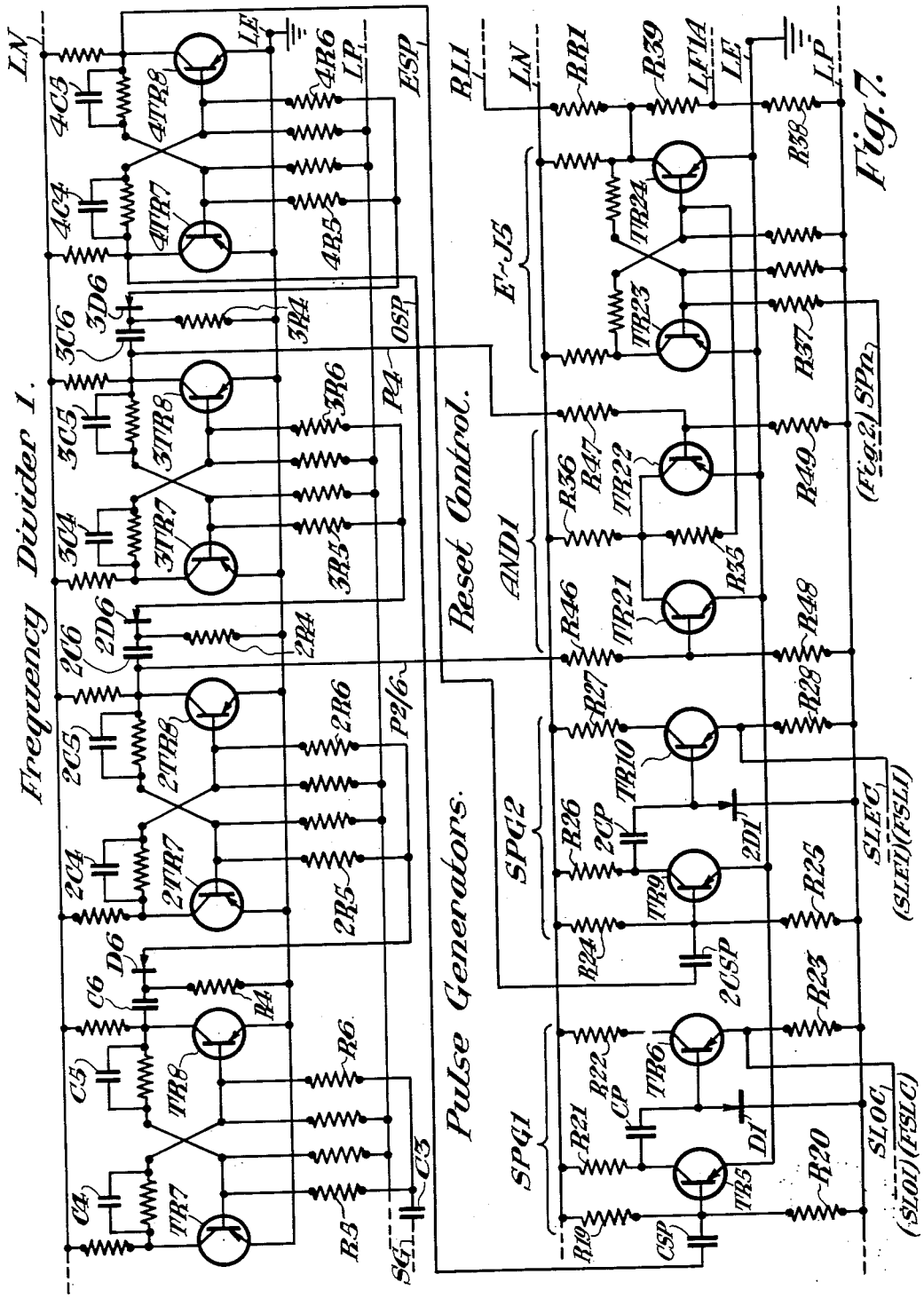

FIG. 7 shows in diagrammatic form the frequency divider for the office transmitting or control counting chain together with pulse generator means and the reset control arrangement. Items similar to those latter two elements are also associated with the station combination counting chain. Stepping generators similar to those here illustrated are also provided in connection with the office receiving chain.

Figure 8:
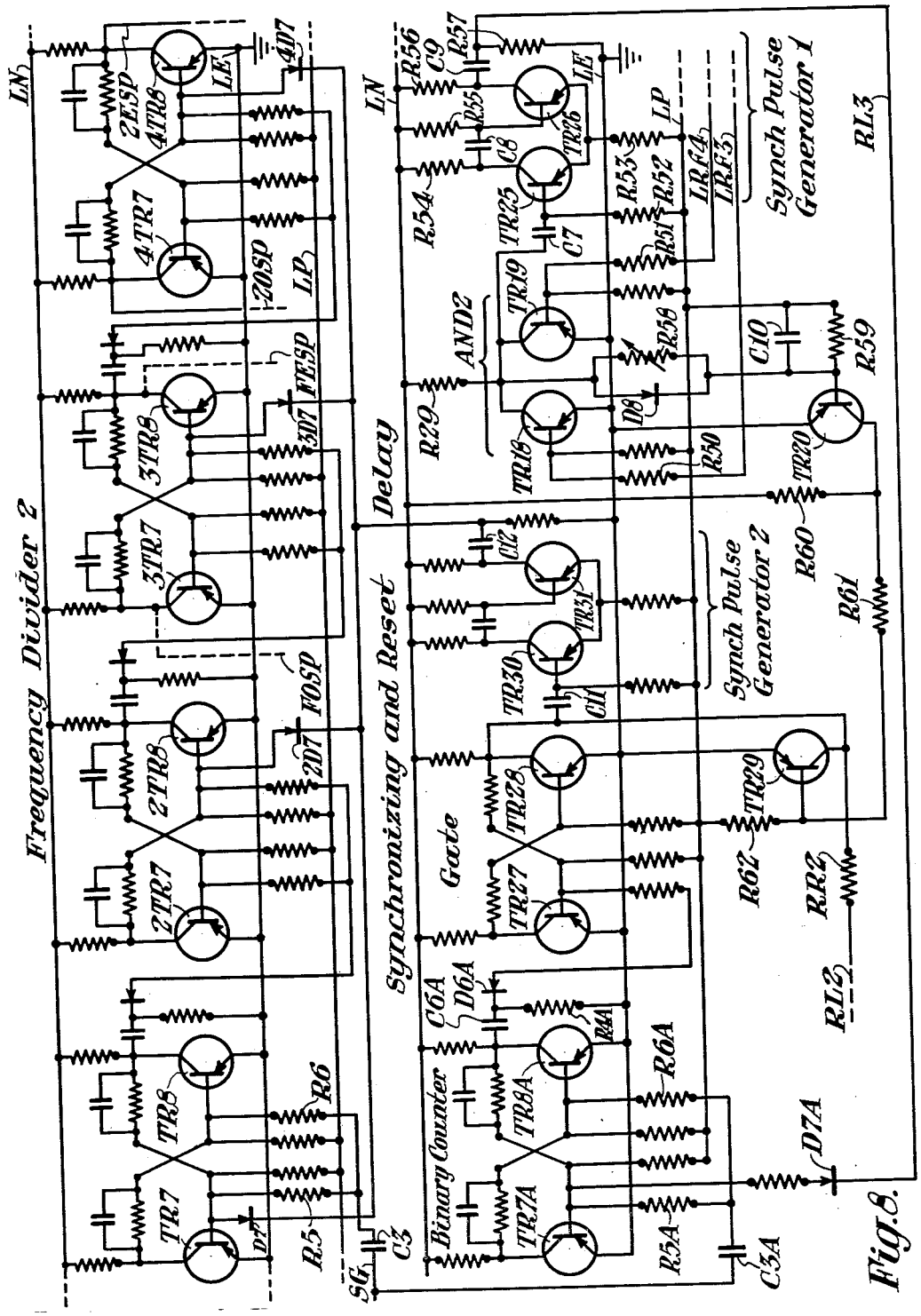

FIG. 8 illustrates the frequency divider for the office receiving chain together with the associated synchronizing and reset delay means. The frequency divider for the station chain and the synchronizing and reset delay means at that location are similar in arrangement to the elements shown in FIG. 8 but differ in this specific example, as will be explained later, by the shortened cycle of operation of the frequency divider.

Figure 9:
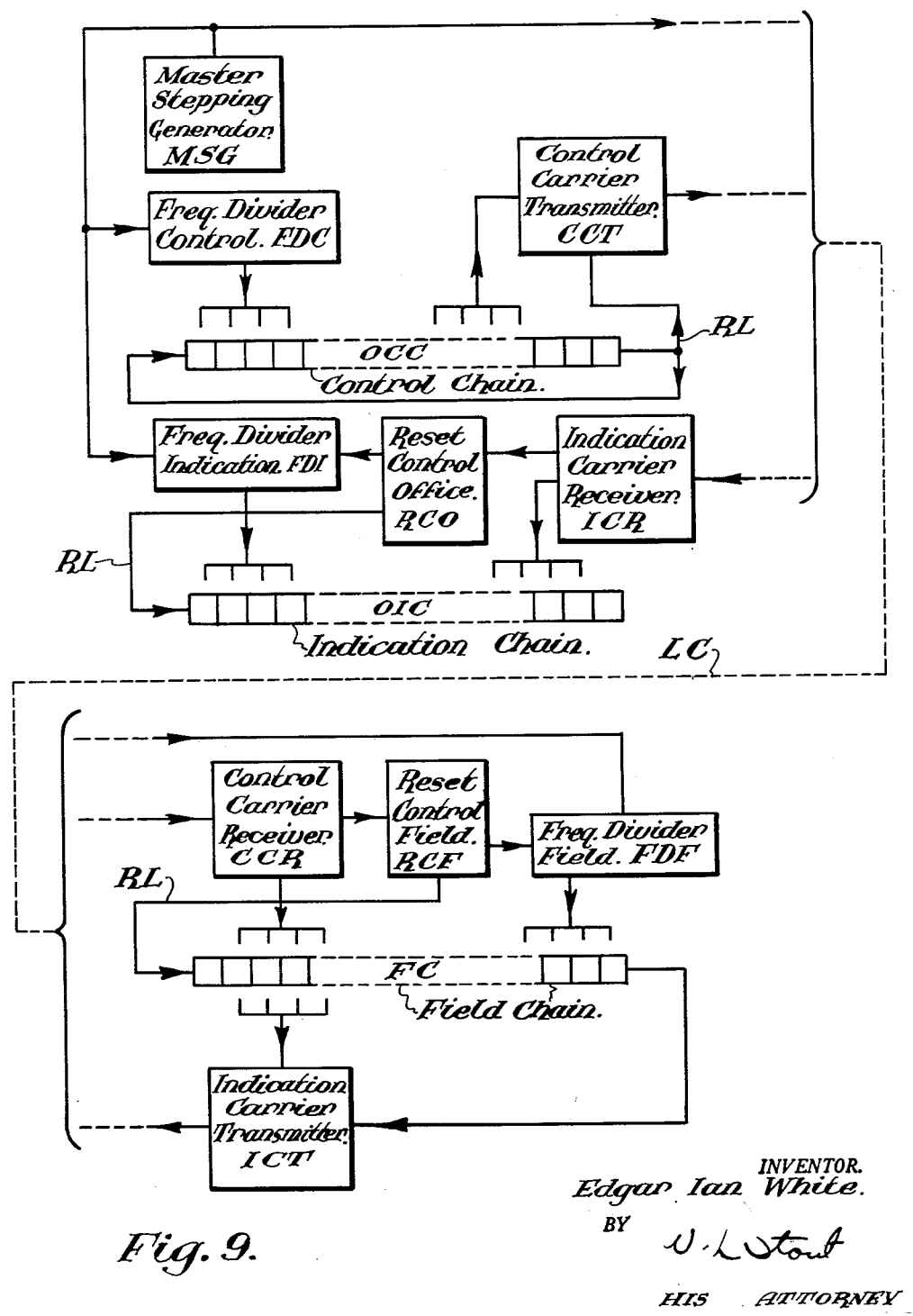

FIG. 9 is a conventional block diagram of a complete basic system embodying one form of my invention, as shown in greater detail in other parts of the drawings.

Figure 10:
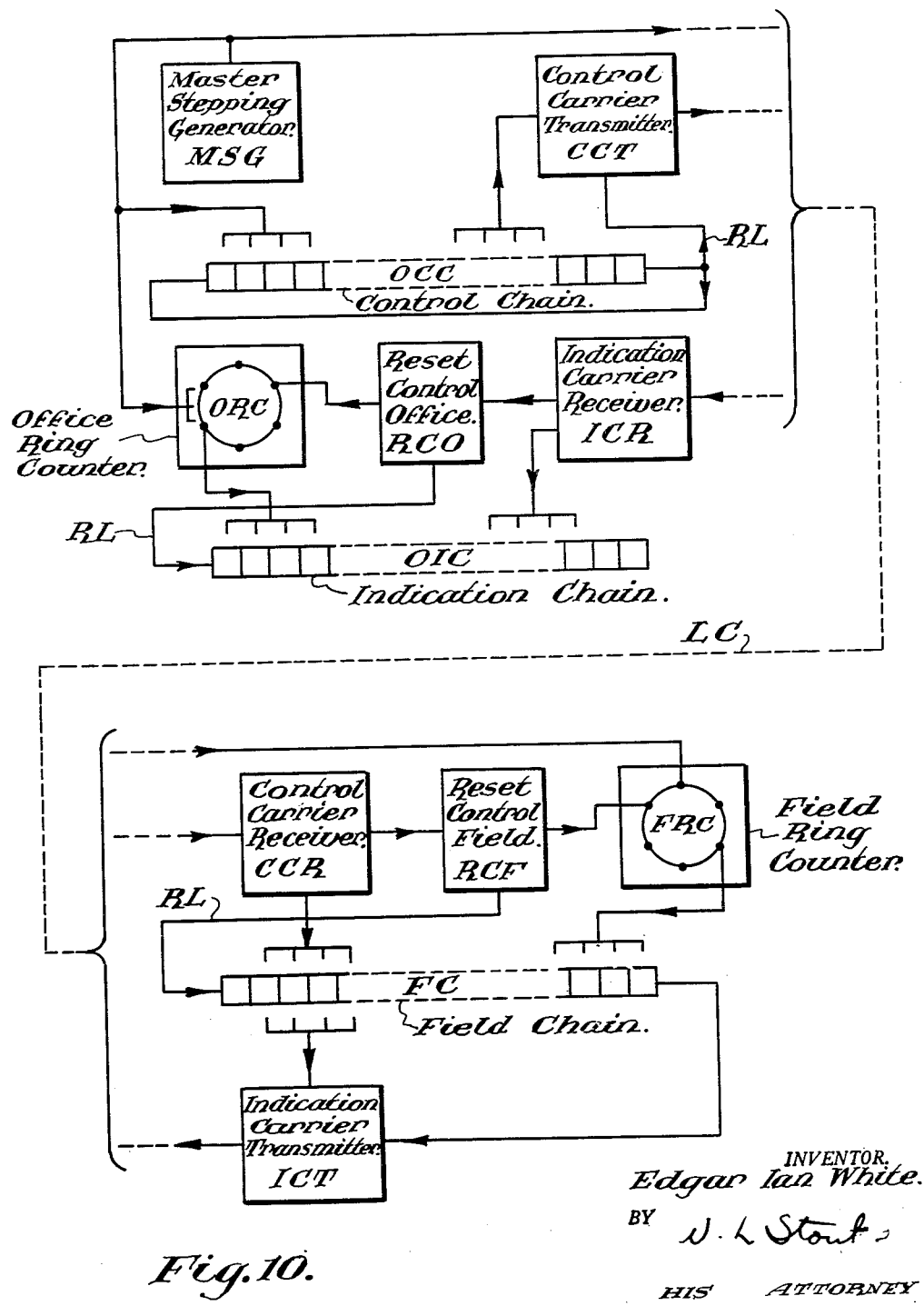

FIG. 10 is a conventional block diagram of another general system embodying a second form of my invention.

In each of the drawings corresponding parts of the apparatus are designated by similar reference characters. In addition, elements which correspond to similar elements in the illustrations in the copending applications, Serial No. 710,718 and Serial No. 815,647, are, where possible, designated by reference characters corresponding to those used in the prior applications in order to promote easier cross reference.

In the specific circuits shown in the present case, all transistors are considered to be of the p-n-p junction type. Thus the polarities described and shown in the circuit arrangements are for this type of transistors. Obviously, n-p-n type transistors can be used with proper modification of the circuits and the use of opposite polarities. The use of such transistors is understood to be included in the system of my invention although such will not be specifically described herein. Each location is provided with a local source of direct current energy such as a battery or a rectifier supply circuit of the proper size and capacity. However, this direct current source is not shown specifically in order to simplify the illustrations. However, bus connections to the supply source are shown throughout. The bus line LE represents the ground or zero potential terminal of the source and also provides a common ground for the entire system. A conventional grounding symbol is shown connected to each such bus wire LE in all of the drawings. The bus wire LP represents the positive terminal of the direct current source and may, for example, be of a positive potential of approximately 1.5 volts above the ground connection. A negative terminal bus wire LN, in a similar system, may be approximately 6.0 volts below the ground connection. However, it is to be understood that these specific voltages are merely illustrative and are not necessarily limiting to all systems. Since a similar energy source is supplied at each location, that is, the office and the station, the detailed circuits applicable to both locations will thus be accurate in their operation and description.

Before proceeding with more detailed description of the system embodying my invention, I shall briefly describe the basic arrangement shown in the block diagrams of FIG. 9 and FIG. 10 which illustrate two different systems embodying the principles of my invention. The general arrangement common to both FIGS. 9 and 10 shows, at the control office seen at the top of each figure, an office control counting chain OCC composed of at least as many consecutively acting counting stages as there are control functions to be transmitted to the station shown at the bottom of each figure, where control is exercised over items of apparatus whose positions are adjustable from the control office. Also at the office is an office indication counting chain OIC which is composed of at least as many consecutively acting counting stages as there are indication functions to be received from the field location. At the outlying area or field station, a field counting chain FC serves for both control and indication functions. This chain, accordingly, is composed of as many consecutively acting stages as there are controls to be received from the office or as there are indications to transmit to the office in accordance with the positions of the items of apparatus at the station which may be reported on. Since it is to be normally expected that the number of indication functions will be greater than the number of control functions, the number of indications is the ruling factor in the length of the chains, all chains comprising an equal number of stages. In addition, there is provided, for reasons to be explained shortly, at least one additional stage over this minimum number established by the greater number of controls or indications. If, as is usual, the number of indications exceeds the number of control functions, certain stages included in the office control chain represent blank step periods. However, the presence of these stages is necessary in order that the same predetermined order may be followed for both controls and indications.

At the control office there are two control carrier frequency transmitters represented in each of these figures by the single conventional block designated CCT, these carrier frequencies differing from one another and serving as a control code for transmission over the communication channel LC to the remote station to characterize the various control functions which it is desired to transmit. One or the other of these transmitters is operative for the duration of each step period as defined by office control counting chain OCC. Likewise, at the remote area, there are two indication carrier frequency transmitters represented by the single block designated ICT, these indication carrier frequencies differing from each other and from those used for the control codes. These indication carrier currents serve as an indication code to characterize the various indication functions representing the positions of the items of apparatus at the station. The control and indication carrier transmitters are controlled by the stages of the corresponding counting chain OCC or FC, as indicated conventionally by the single line diagram.

Control code receiver CCR at the remote area translates the control carrier code into a characteristic output which is applied, through the action of the various stages of chain FC, to control the positions of the respective items of apparatus, which are responsive in turn, one during each step period of the field counting chain. This control is shown conventionally by a single line representation. Likewise, at the office location, indication carrier receiver ICR translates the indication carrier codes into output characteristics which are fed, one during each step period of office indication chain OIC, to the indication devices which assume positions or indications representative of the position of the corresponding item of apparatus at the field location.

The step periods in each chain are defined as extending from the reversal of condition of the stage for that period to the condition reversal of the stage representing the next period. This condition reversal advances down the chain under the control of the applied stepping pulses. To reset the stages once the conditions of all of the chain stages have been reversed, a resetting pulse is applied at least to the first stage, the stages being connected in each chain so that the resetting may cascade throughout the chain upon the resetting of the first stage. This reset pulse is shown as applied conventionally from the reset control apparatus at each location over a line RL to the first stage of the corresponding chain with the exception of the office control chain for which the reset pulse is applied from the last stage of the chain directly to the first stage.

Referring now specifically to FIG. 9, a master stepping generator MSG generates a supply of pulses at a frequency which is a selected multiple of the desired stepping rate of the various counting chains. This pulse supply is applied through frequency dividers FDC and FDI to the counting chains at the control office, that is, the control and indication counting chains. These frequency dividers have a reduction ratio equal to the multiple of the stepping rate at which the pulses are generated. Thus, the frequency dividers each emit one stepping pulse for each series of master stepping pulses representing the multiple rate. A supply of master stepping pulses is also transmitted over the communication channel by means of a carrier communication link comprising a transmitter at the office and a receiver at the outlying area, this link not being shown. The master pulses received at the remote station are supplied to a similar frequency divider FDF from which pulses are applied to field counting chain FC. Since, however, the master stepping pulses are transmitted over a different carrier channel than the channels comprising the control and indication carrier links, the arrival of these pulses at the remote station may be delayed by an interval of time differing from the delay of the control code pulses. This delay may be as much as several step periods, particularly if the transmission distance is great and the pulse periods are short, or if repeaters must be inserted in the communication channel. In order to correct such discrepancy between the arrival of the various pulses, the measures described in the following paragraphs must be taken.

A final stage, excess to the requirements for the transmission of information, is added to the office control counting chain. An output is taken from this stage over reset line RL on one hand, as already explained, to the first stage of the same chain, and on the other hand, to the control code transmitters which respond to such reset output to transmit both carrier currents at once. The control code receiver at the remote station is responsive to this distinctive transmission to energize a reset control circuit RCF which, in turn, applies its output over a reset line RL to the first stage of field counting chain FC to initiate the reset of that chain. Until the field counting chain has been reset, it is not responsive to stepping pulses applied thereto by the associated frequency divider. Since resetting is initiated over the control code communication link, the beginning of the first counting cycle is delayed by the same amount of time as the control code delay time. Thereafter, the stepping of field chain FC proceeds in step with the periods of the control code to the extent at least that the step periods defined by the field chain overlap the corresponding periods of the control code.

To insure that these step periods are phased correctly with respect to the periods of the control code pulses, an output is taken from field reset circuit RCF to frequency divider FDF. This latter unit responds to this output to make only a preselected count before emitting the next stepping pulse. The length of this preselected count depends on the point in each step period, as defined by the field counting chain, at which the appropriate functional element becomes responsive to the control code to actuate the associated item of apparatus into conformity with the prevailing code character. Should the response of the apparatus be arranged to occur at the start of the step period defined by the field counting chain, the stepping pulses must be displaced by approximately half a step period with respect to the periods of the control code so as to insure that the response of the apparatus occurs midway in the period of the control code. Under these conditions, the preselected count would be limited to a count of half the multiple at which master stepping generator MSG transmits its pulses. If, however, the response is arranged to occur midway in the step period, the preselected count to bring about the same condition would be the full count representing the multiple of the stepping pulses.

In order to similarly synchronize the transmission of the indications from the remote stations and the stepping of the office indication chain, an output from a corresponding additional final stage of field counting chain FC is transmitted over the indication carrier communication link to reset and phase the office indication counting chain in a manner similar to that just described for the resetting and phasing of the field chain. This final stage output acts as a cycle synchronizing pulse which, being transmitted over the same communication link as the similarly directed characterizing transmissions, serves to couple the chains to the continuously maintained timing transmission represented by the stepping pulses from master generator MSG. The cycle, or a portion of a cycle, which, upon the starting of system operation, precedes the first cycle synchronizing pulse of course operates incorrectly but this can be tolerated since correct operation follows immediately afterwards. It will be appreciated that with the feature of the frequency dividers making a preselected count in response to the cycle synchronizing pulse, the response to periods of control or indication code may be phased correctly regardless of when they are brought about in relation to the step periods.

The system shown in FIG. 10 differs from that of FIG. 9 in the provision of a master generator MSG at the control office whose output of stepping pulses is at the desired stepping rate of the various counting chains instead of a multiple of that desired rate. Further, at the office and field station, there are provided ring counters ORC and FRC in place of the frequency dividers associated with control office indication counting chain OIC and field counting chain FC. In this system of FIG. 10, the stepping pulses are applied directly to office control chain OCC. These ring counters operate continuously, either driven by a local oscillator or at their natural relaxation rate, and perform approximately one revolution per stepping pulse. Preferably, the rate of counting of these ring counters is actually a little slower and the stepping pulse is then used to pull into, and maintain the ring in, synchronism once each step period. Each of the ring counters is preset in response to the cycle synchronizing pulse to a particular pattern in which all but a predetermined one of the stages of the ring are in the same state such that a preselected count is made to a particular stage in the ring before the next stepping pulse is emitted to the associated counting chain. Thereafter, further stepping pulses are emitted each time that stage is reached in the cycle of the counter. Thus, the stepping pulses determine the synchronous operation of the ring counters while the cycle synchronizing pulse determines the conduction pattern previously referred to. Preferably, the stages of the ring counters employ transistors in a well-known manner. The actual arrangement shown in FIG. 10 is not further amplified in any detail in the remaining figures of the drawing or in the description which follows, this being a secondary arrangement of the system embodying my invention. It is believed that the use of such an arrangement and its operation will become obvious after the following detailed description of the arrangement using the frequency divider networks.

Figure 1:
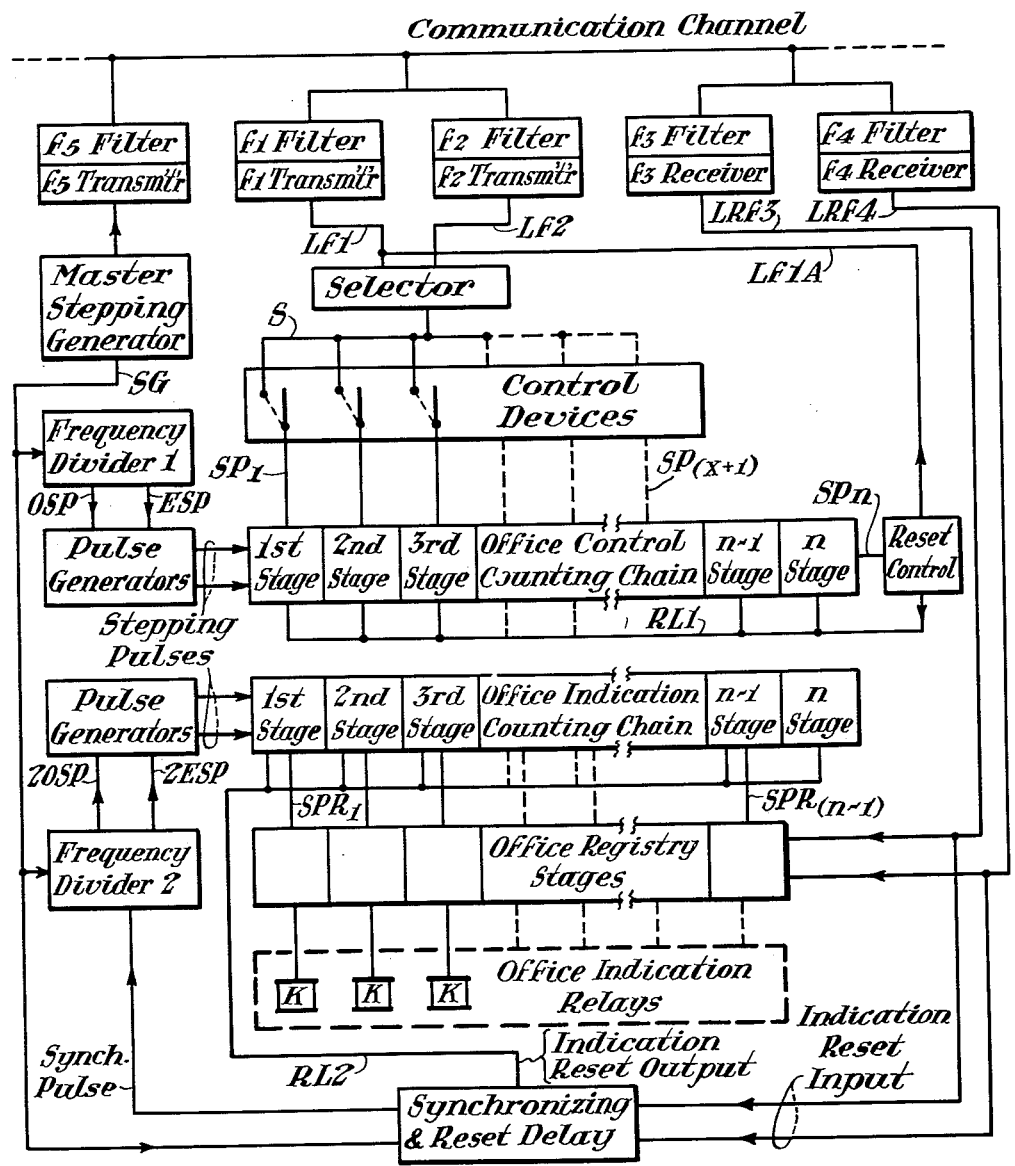

I shall refer now to the more detailed schematic chart and block diagram of the office apparatus shown in FIG. 1. In the center of this figure, shown by conventional block diagrams, are the two counting chains, one for transmitting and one for receiving, respectively designated as the office control counting chain and the office indication counting chain. Each of these chains has the same number of counting stages, as is obvious. As will appear hereinafter, similar stages of each chain are combined into a single unitary arrangement in order to permit standard wiring. This standard wiring unit also includes a corresponding registry stage, a plurality of which are diagrammed in FIG. 1 immediately below the indication chain. There is one registry stage for each counting stage of this indication chain, each registry stage being active when the associated receiving stage responds in turn to the stepping counts.

Each counting chain is driven by two pulse generators, one for the odd-numbered stages and the other for the even-numbered stages. These pulse generators operate alternately. In other words, they provide alternate outputs over the corresponding stepping bus lines to provide a cascaded stepping operation during which the counting stages respond sequentially. Each pair of pulse generators is controlled by an associated frequency divider. Although two schematic connections are shown from each frequency divider to the associated pulse generators, the combined stepping pulse output of the frequency divider is at the desired stepping rate for the counting chains. However, the two connections shown schematically provide an input to each of the two pulse generators, the inputs occurring alternately at the desired rate. Each frequency divider is supplied directly from a master stepping generator whose output frequency is a selected multiple of the frequency of the desired stepping rate. This operation will be described in detail shortly, but for purposes of a specific illustration, a selected multiple of eight times the desired stepping rate is herein used. It is to be noted that the output of the master stepping generator is connected in multiple to the two frequency dividers and also to a synchronizing and reset delay arrangement which will be discussed shortly.

In the block immediately above the control counting chain is illustrated a plurality of control devices, there being one such device for each function at the station to be controlled. There is not necessarily, and such is illustrated here, one control device for each stage of the transmitting chain. This results from the fact that the office control counting chain, the office indication counting chain, and the combined chain arrangement at the station must be of equal length, i.e., an equal number of stages, since the reset and synchronizing of the various chains are interdependent. Since there are normally more indication functions than control functions, some stages of the office transmitting counting chain will not be utilized. The control devices may be manually controlled levers, push buttons, or other types of switches, such as toggle switches. They are shown as being two-positioned levers in order to simplify the understanding and description. In one position, shown dotted in FIG. 1, each lever closes a circuit, while in the other position, shown solid, the circuit through the lever is interrupted. Each control device, in its circuit closing position, completes a circuit between the associated counting stage and the selector circuit. It is to be noted that connections of the various control devices are in multiple through the bus line S to the selector. However, only one control device is effective at a time in controlling the transmission of the carrier currents. The selector arrangement actuates the carrier transmitters in accordance with the position of the active control lever.

Two carrier frequencies are provided, as previously mentioned, for the transmission of the control functions. These are designated as frequencies $f1$ and $f2$. Each frequency is generated in a corresponding transmitter unit designed by a similar reference character. These transmitter units are connected, through corresponding filter units which pass only the associated frequency, to a single communication channel. The carrier transmitters are activated, to transmit the corresponding carrier current, over lines $Lf1$ and $Lf2$ from the selector. As will appear hereinafter during the detailed discussion of the circuit elements, when a control device is in its open circuit position with the corresponding counting stage active, the selector is responsive to cause the transmission of a pulse of current of frequency $f2$, the control being over line $Lf2$. However, when the control device is in its circuit closing position to connect the associated line SP to bus connection S and thus into the selector, the selector is responsive to cause the transmission of a carrier current pulse of frequency $f1$, the control passing over line $Lf1$. The communication channel may be a two-wire line circuit, a carrier channel capable of carrying the various carrier circuits here discussed, a microwave channel, or other such channels well known in the art. It is immaterial to the present discussion and an understanding of my system what type of communication channel is provided between the office and the station. Also connected to the communication channel through filters of the proper band pass characteristics are carrier current receivers $f3$ and $f4$ for the reception of carrier currents of frequencies $f3$ and $f4$ from the station of FIG. 2. The receivers control the response of the registry stages through the corresponding receiving or indication counting stages over receiving lines $LRf3$ and $LRf4$. Each registry stage has associated therewith an indication relay K which is energized or deenergized in accordance with the indication received, as will be more fully explained hereinafter.

As will appear later, it is necessary to reset each stage of each counting chain at the end of a counting cycle to condition that chain for the next cycle of operation. For the transmitting chain at the office, a reset control unit, shown by a conventional block diagram, is controlled over scanning pulse line $SP_n$ by the last or "n" stage of the counting chain to emit a reset pulse. This pulse is applied over bus connection RL1 to each stage of the chain, in multiple, to effect a resetting action to condition each stage for another count. Alternately, as shown in FIG. 9 the reset pulse may be fed only to the first stage and the succeeding stages reset by cascaded action controlled from stage to stage by provided connections. Such a method is shown in the previously mentioned application Serial No. 710,718. The reset control unit of FIG. 1 also causes the transmission of a reset pulse to the station over the control function carrier channels. This reset pulse, which also serves as a synchronizing pulse as will be discussed hereinafter, consists of a current pulse of both carrier frequencies, that is, frequencies $f1$ and $f2$. Since, in the specific illustration, there can be no control device associated with stage "n" of the transmitting chain, the selector remains in condition to cause the transmission of a pulse of frequency $f2$. The reset control is connected to transmitter $f1$ over line $Lf1A$ to cause the transmission of a pulse of this carrier current also.

A similar reset pulse from the station or stations for the receiving chain at the office is received as a combined pulse of carrier current of frequencies $f3$ and $f4$. These carrier current pulses are received in the usual manner and are fed into the synchronizing and reset delay unit, shown at the bottom of FIG. 1 by a conventional block, to initiate the reset action. The reset delay unit is also controlled by the master stepping generator as indicated schematically, this latter input providing a control source by which a selected portion of a stepping period may be determined. When the reset pulse consisting of current of both carrier frequencies $f3$ and $f4$ is received, in conjunction with the count control furnished by the master stepping generator, the reset delay unit emits a reset pulse which is fed into the indication counting chain over bus connection RL2. As shown, each stage of the chain is connected in multiple to bus wire RL2 for simultaneous reset. Again, the reset action may be cascaded, as an alternate method, from the first stage throughout the chain. The reset delay unit also emits, at approximately the same time, a synchronizing pulse to reset the frequency divider for the indication counting chain by entering therein a preselected count for delay compensation and phasing purposes.

Figure 2:
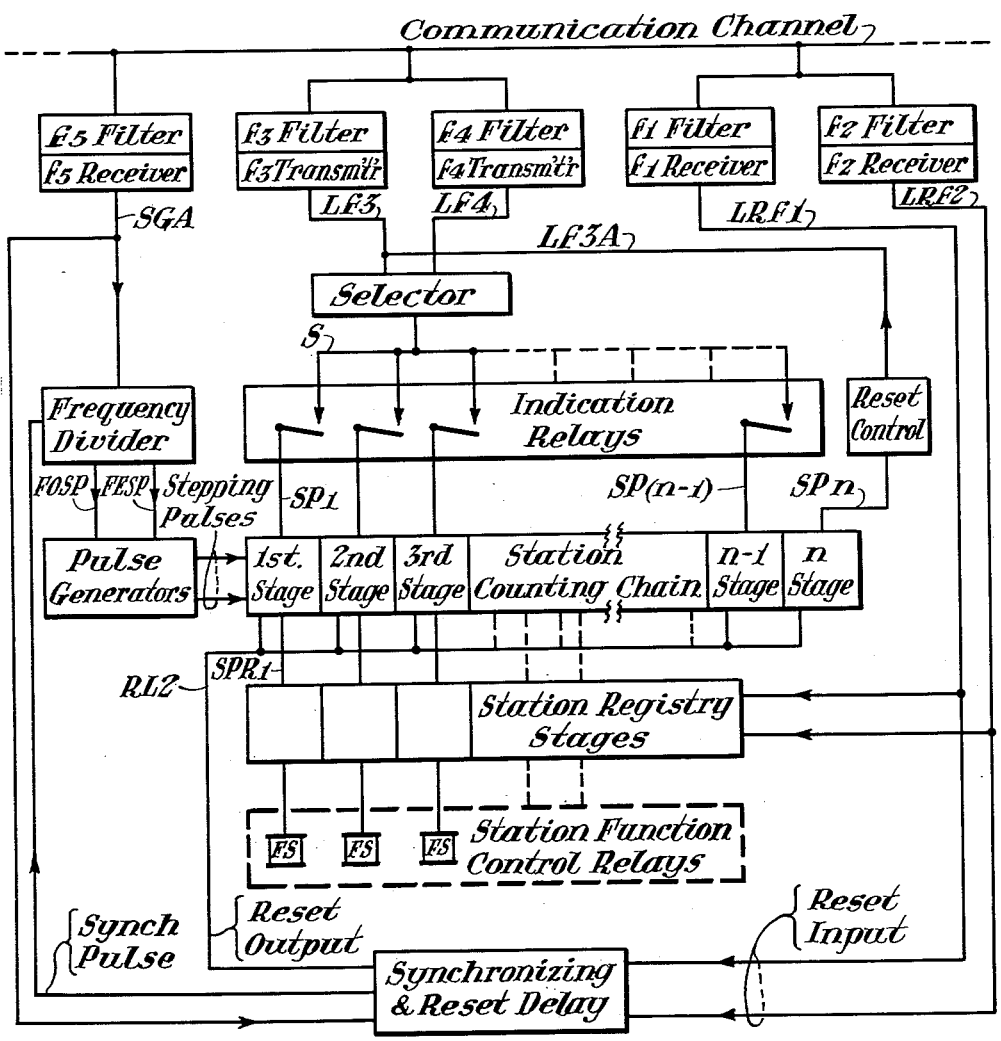
FIG. 2 is a similar block diagram and operational chart, also in more detail than FIG. 9 for the single station location here illustrated. The apparatus at the single station of FIG. 2 cooperates with the apparatus shown in FIG. 1 to provide a complete system embodying my invention.

In FIG. 2, the arrangement of the apparatus at the station which cooperates with the office apparatus to provide a complete system is shown in a corresponding block diagram and schematic arrangement. At the station, only a single counting chain is used, each stage of which may consist of a standard unit, identical with that at the office, comprising a transmitting and a receiving counting stage and a registry stage. Thus the station counting chain operates alternately as a transmitting and a receiving chain as each portion of a counting stage is alternately activated. A registry stage is provided for each control function transmitted from the office to the station, although in a system using the standard unit arrangement there would be a registry stage for each counting stage of the chain. Only those are illustrated in FIG. 2 which correspond to the number of control functions which are actually transmitted from the office. Controls are received over the communication channel through a filter-receiver combination for each carrier current frequency, that is, for frequencies $f1$ and $f2$, which are transmitted from the office. The receivers are connected to the counting chain receiving circuits over receiving lines $LRf1$ and $LRf2$. In accordance with the carrier current pulse received, registry stages are activated in response to the operation of the corresponding counting stage to control the station function control relays FS which are shown in the dotted rectangle immediately below the registry stage block diagram. Additional discussion and description of this operation will be included in connection with the detailed circuit arrangements.

Also connected to the communication channel through proper band-pass filters are carrier current transmitters $f3$ and $f4$ for the carrier current frequencies $f3$ and $f4$ which are received at the office. These transmitters are controlled through a selector unit similar to that at the office, the connections being completed over lines $Lf3$ and $Lf4$ as indicated. The selector in turn is controlled by each transmitting stage of the counting chain through the indication relay contacts, illustrated in a conventional manner by contact symbols inside the block directly above the counting chain. These relay contacts open and close the various SP circuits from the transmitting stages of the chain to the common bus connection S which in turn is connected to the selector. In a manner similar to that for the control devices at the office, the selector is responsive to an open relay contact, when the assigned transmitting stage is active, to cause the transmission of current of frequency $f4$. With the associated contact closed when a particular counting stage is active, the selector, in response, causes the transmission of carrier current of frequency $f3$. It is to be noted that the communication channel at the top of FIG. 2 to which the carrier transmitters and receivers are connected through corresponding filter networks is the same single communication channel illustrated at the top of FIG. 1.

Stepping pulses from the master stepping generator at the office are received over the communication channel by carrier circuit $f5$. Carrier current pulses of this frequency feed through filter $f5$ to the corresponding carrier receiver $f5$. These received pulses are supplied over connection SGA to a single frequency divider unit. The frequency divider is arranged to provide alternate outputs to drive two separate pulse generators shown conventionally by a single block. From these, stepping pulse outputs are alternately supplied to the counting chain for the transmitting and receiving stages, as schematically indicated in FIG. 2. As will be explained more fully later, the station frequency divider, in the specific system here illustrated, is arranged to provide outputs at twice the frequency of the output of either frequency divider at the office. In other words, this frequency divider operates on a sub-multiple factor of four rather than eight. The output of the carrier receiver $f5$ is also fed into a synchronizing and reset delay unit similar to that shown at the office location. This reset delay unit is also arranged to receive the reset pulse from the office comprising simultaneous pulses of carrier currents $f1$ and $f2$. When this condition exists, the reset delay unit emits a reset pulse to the counting chain over a bus connection RL2 to cause the reset of the transmitting circuit of each stage of the counting chain. This reset action cascades from the transmitting circuit stage to the associated receiving circuit stage. Alternately, of course, the reset action may cascade from transmitting to receiving stage to the succeeding transmitting and receiving stages throughout the entire counting chain, as is the method used in the aforementioned application Serial No. 710,718. At the same time, the reset delay unit emits a synchronizing pulse which is supplied to the frequency divider, similar to the operation at the office, for purposes of providing a preselected count entry to assure proper reception of the control functions. A reset control unit connected to the final or "$n$" stage of the counting chain controls the transmission of the reset pulse comprising simultaneous carrier current pulses of frequencies $f3$ and $f4$ for transmission to the office at the completion of each counting cycle at the station. Under these conditions, the transmitter $f3$ is controlled over an auxiliary connection $Lf3A$ from the reset control unit direct to the transmitter in a manner similar to the auxiliary control at the office.

Having described the general arrangement of the system as shown by the block and schematic diagrams of FIGS. 1 and 2, I shall now described various circuit elements and arrangements in sufficient detail for an understanding of their operation. In this description, where office and station elements are similar in structure and operation, a single description only will be included. Where slight differences in similar elements exist, the descriptions will be compared and only the differences shown and/or described in detail for the second item of apparatus. I shall begin by referring to FIG. 3 in which is illustrated a single combined stage of the office counting chains plus the selector network at the office. This selector network, of course, is identical with that used at the station location.

Each composite stage of the office counting chains includes two bi-stable electronic circuit arrangements of common configuration. Each of these circuits is more commonly known as an Eccles-Jordan circuit arrangement and their transistorized forms herein shown are designated by references E–J1 and E–J2. The former comprisse a transmitting stage while the E–J2 circuit provides the receiving stage. It is a characteristic of an Eccles-Jordan circuit arrangement that its prevailing condition is reversible by the application of a stepping pulse thereto. The circuit is then stable in the reversed condition despite the continued application of otherwise operative stepping pulses until the circuit is reset once more to its former or normal condition. The principal elements of circuit E–J1 are transistors TR1 and TR2 while the principal elements of circuit E–J2 are transistors TR3 and TR4. These references are similar to those used in the aforementioned copending application Serial No. 710,718 in the counting chain stages, although the operation of the present stages is somewhat different, as will appear. It has already been assumed that all transistors in the present system are of the p–n–p type. The collectors of each of the four transistors are connected to the negative terminal of the direct current source through bus connection LN, the individual connection from the collectors including, respectively, resistances R1, R1', R7 and R7'. The emitters of these transistors are directly connected to bus connection LE which is at ground or zero potential. The bases of the transistors are connected through resistances R3′, R3, R9′ and R9, respectively, to the positive potential at bus connection LP. The crossover connections characteristic of the Eccles-Jordan circuit arrangement include resistors R2 and R2′ in the case of circuit E–J1 and resistors R8 and R8′ in the case of circuit E–J2.

Figure 3:
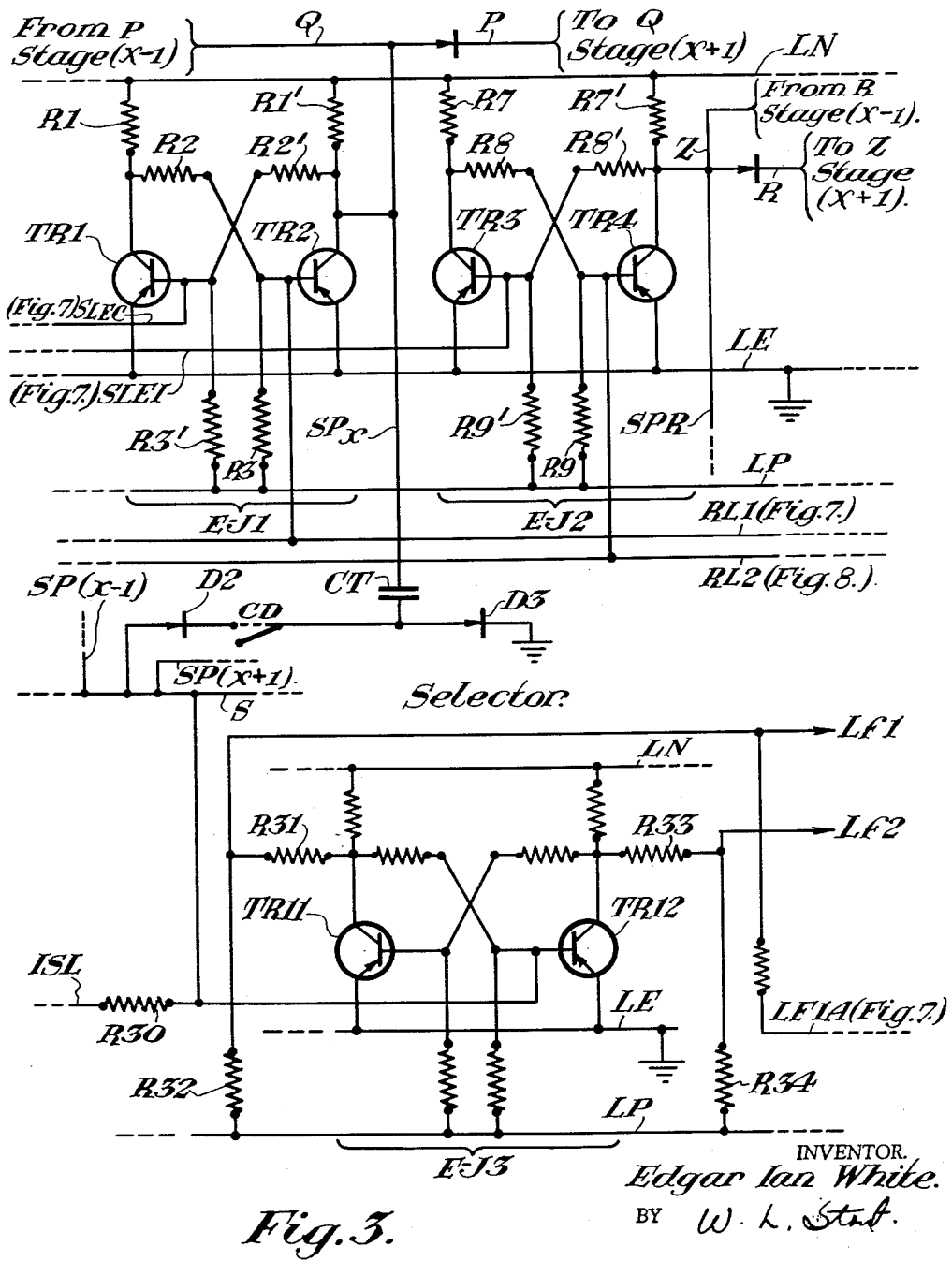
FIG. 3 is a diagrammatic illustration of a single stage of the office counting chains, both transmitting and receiving, together with the selector circuits for carrier transmission control. The selector circuit portion of this figure may also be used at the station location, as will appear from later explanations.

Each of the circuit arrangements is coupled with the preceding and succeeding stage in the corresponding counting chain through coupling connections P, Q and R, Z, respectively. The base of transistor TR1 is further connected to the control chain stepping line SLEC, which originates in FIG. 7 and will be explained later. The base of transistor TR3 is similarly connected to the indication chain stepping line SLEI, also originating in FIG. 7. It is assumed that counting stage X shown in FIG. 3 is an even-numbered stage, thus lines SLEC and SLEI are used. Odd-numbered stages are connected in a similar manner to stepping lines SLOC and SLOI, shown in FIG. 7. By means of the interstage couplings, the response of the Eccles-Jordan circuits to operative stepping pulses is made conditional to the prior reversal of the immediately preceding circuit stage in the same counting chain so that successively applied pulses advance the reverse condition in cascade through a particular chain from one stage to the next.

Describing in greater detail the action of the counting chain stages, the stepping pulses received over lines SLEC and SLEI take the form of momentary interruptions of an otherwise steady positive potential. In other words, pulses of zero potential are periodically received over these stepping lines interrupting the normal positive potential. This stepping will be explained in more detail later in connection with the pulse generators. In the normal conditions of the E–J circuits, transistors TR1 and TR3 are nonconducting and transistors TR2 and TR4 are of necessity conducting. At each circuit arrangement, the feedback over the crossover connections through resistors R2′ and R8′, respectively, as a result of the interstage connections Q and R, is such that the potentials at the bases of transistors TR1 and TR3 are maintained positive even during the interruption of the positive potential, that is, the reception of a zero potential pulse, over the relevant stepping line. Thus a further priming condition is required at the bases of these transistors if their polarity is to be reversed from positive to negative in order to effect a transfer from the nonconducting to the conducting condition. This further priming is provided by the elimination of the possibility of any positive potential being supplied to the base of transistor TR1, for example, over connection Q and resistor R2′ from the corresponding E–J1 circuit of the preceding stage. This priming condition occurs when transistor TR2 of stage (X−1) becomes nonconducting upon the reversal of the condition of that bi-stable circuit.

This priming action is of itself insufficient to overcome the combination of the normal circuit feedback and the stepping supply positive potentials. However, when the next zero potential stepping pulse is received at the base of transistor TR1, the combination of the priming condition and the stepping pulse potential are sufficient to condition the base of transistor TR1 negative with respect to its emitter so that this transistor becomes conducting. Transistor TR2 becomes immediately non-conducting due to the feedback potential over resistor R2 from the collector of transistor TR1. The collector of transistor TR2 therefore approaches the full negative potential of bus connection LN, changing from the zero or ground potential of line LE. This removal of the relative positive potential from connection P to the next succeeding stage (X+1) primes transistor TR1 of the corresponding E–J1 circuit in that stage. As is well known, when transistor TR1 is conducting, the input impedance is very much lower than when it is nonconducting so it can not revert to its former condition when the positive potential is restored to the stepping line. Thus, once bi-stable circuit E–J1 has been reversed in condition; it cannot be restored to its former condition until a deliberate resetting action, which occurs after the complete counting action or cycle through the counting chain. The priming action into the corresponding E–J1 circuit of the next succeeding stage enables the advance of the reverse condition to cascade throughout the counting chain. It is obvious that similar reversal and priming actions occur in the receiving chain consisting of the E–J2 circuits in cascade. For the receiving or indication chain, the priming is accomplished over line connection Z from the preceding stage and the new priming condition is transferred over connection R to the succeeding stage. A more complete explanation of the priming action, if desired, may be had by reference to the copending application for Letters Patent of the United States Serial No. 818,195, filed June 4, 1959, by E. I. White for a Counting Chain, this application having the same assignee as the present case. The priming action may also be controlled as described in the aforementioned copending application Serial No. 710,718, particularly in connection with FIG. 2 of that prior application, but such operation is not here considered.

Figure 4:
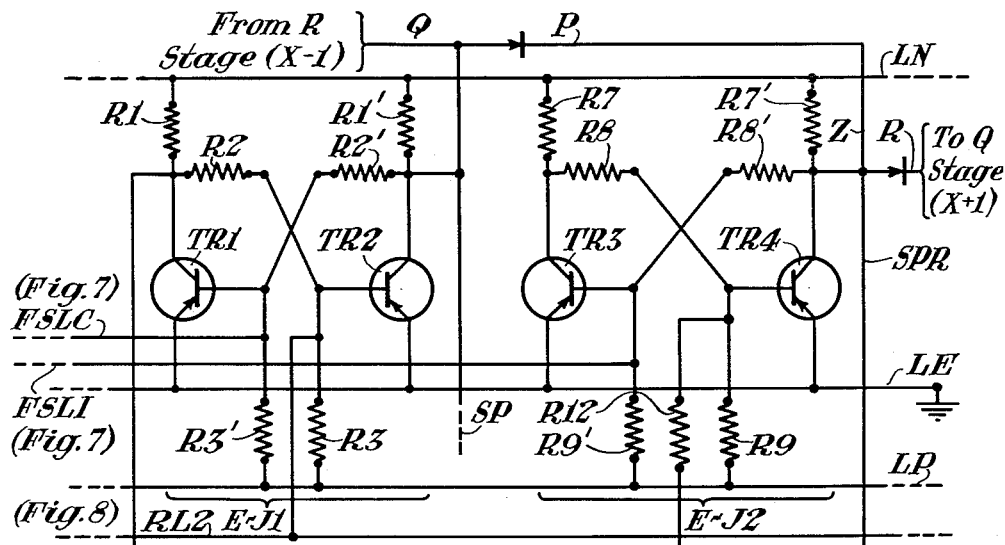
FIG. 4 shows diagrammatically a single stage of the station combination counting chain together with the associated registry stage for the receiver circuit portion of that particular counting chain stage. Again the latter portion, that is, the registry stage, is similar to the registry stage associated with each stage of the office receiving or indication counting chain.
Figure 4:
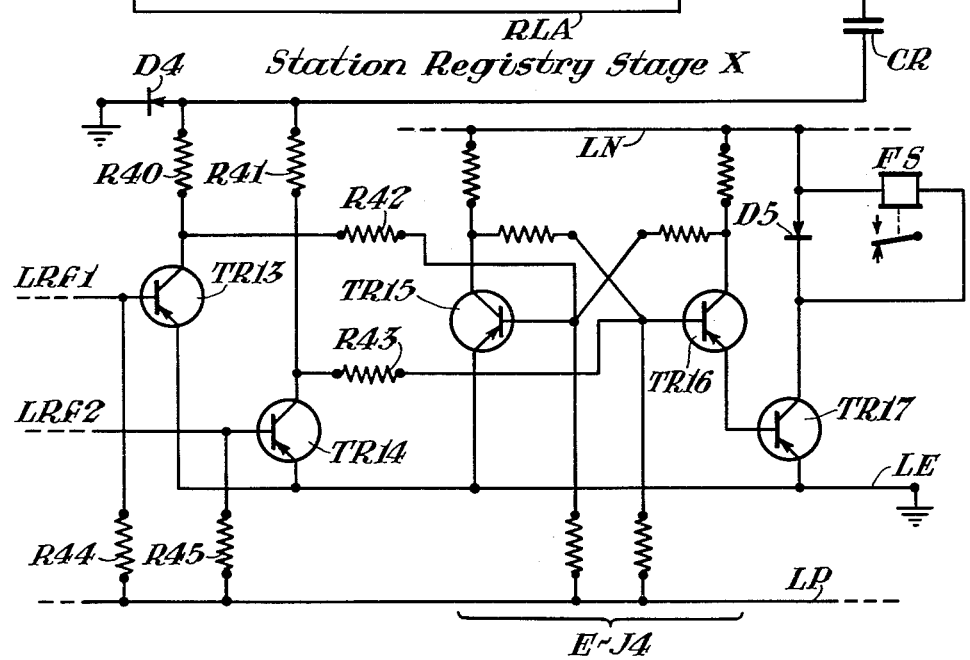

Referring now to FIG. 4, at the top is shown a single combination stage of the station counting chain. In the standard units shown, this stage also includes two Eccles-Jordan circuit arrangements E–J1 and E–J2 for the transmitting and receiving portions of the chain, respectively, similar to that at the office. It is obvious that the station chain has the same general arrangement of circuit elements as at the office. For this reason, similar reference characters have been used in this portion of FIG. 4 which is similar to the upper portion of FIG. 3. However, in the operation of the station counting chain, the priming condition flows from transmitting stage to receiving stage to transmitting stage, etc., in cascade. In other words, the priming condition is received by circuit E–J1 from the receiving stage of the preceding counting stage (X−1). Upon reversal of the condition of circuit E–J1 in stage X, the priming condition is transmitted over connections P and Z to circuit E–J2 of the same stage. When circuit E–J2 reverses, the priming condition is transferred to circuit E–J1 of the succeeding stage (X+1). Stated in another manner, when transistor TR2 becomes nonconducting, it primes or conditions transistor TR3 to become conducting upon the reception of the next stepping pulse. Transistor TR4, when it becomes non-conducting, primes transistor TR1 in the succeeding stage to become conducting during the reception of the next stepping pulse. The stepping pulses are received alternately over stepping lines FSLC and FSLI, which originate in FIG. 7. The operation of each combination stage of the station counting chain is thus somewhat more similar to the operation described in the copending application serial No. 710,718 than is true of the office counting chains. It is believed that the operation of station counting stage X illustrated in FIG. 4 may be completely understood with this brief explanation when taken in connection with the explanation for the office chains and by reference, if desired, to the copending application.

Figure 5:
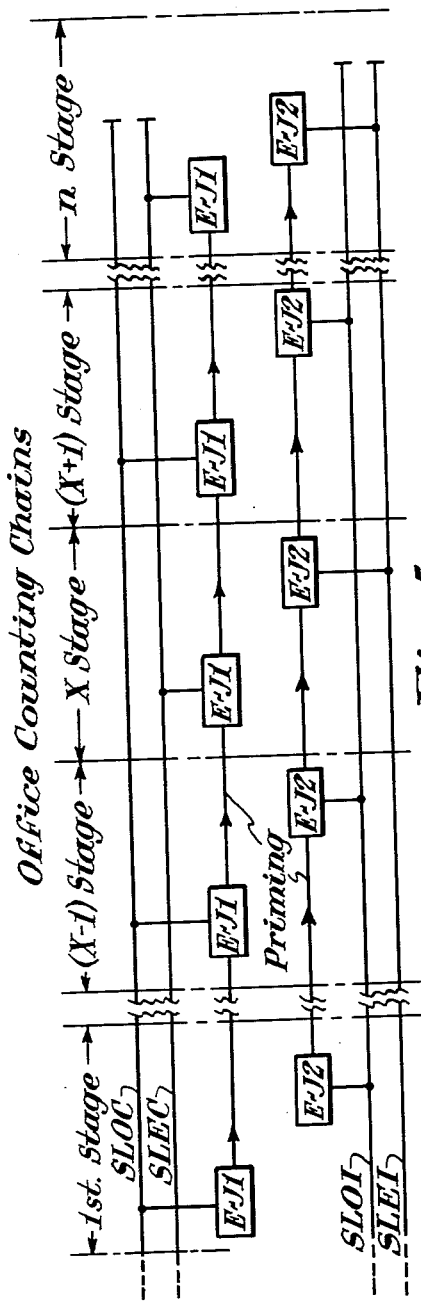
FIG. 5 is a schematic illustration of the operation of the office counting chains.
Figure 6:
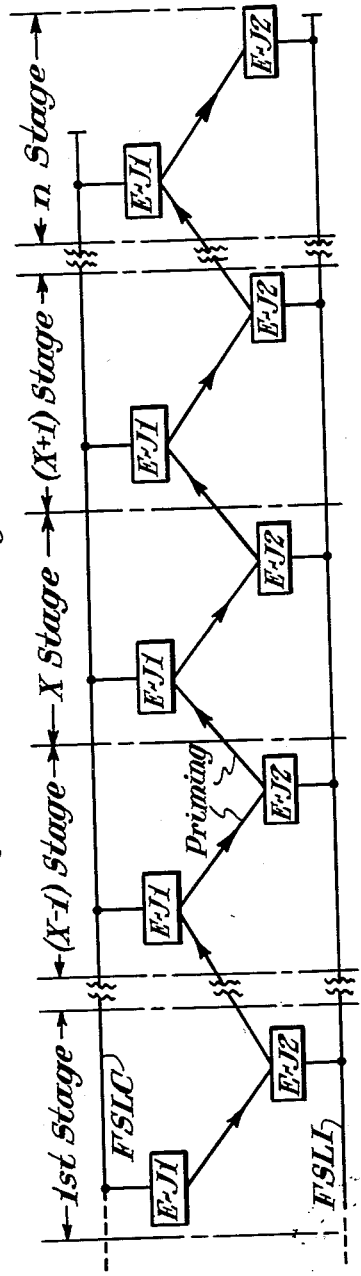
FIG. 6 is a similar schematic illustration of the operation of the station counting chain.

A comparison of the operation of the counting chains at the office and at the station is shown schematically in FIGS. 5 and 6 which are block diagrams with flow arrows illustrating the operation. FIG. 5 represents the two counting chains at the office by two parallel series of conventional blocks, each representing a counting stage and designated as circuits EJ–1 and EJ–2, respectively. By means of lines with flow arrows, the diagram illustrates that the priming condition moves from stage to stage within each counting chain. This, as previously discussed, is necessary because the chains operate separately and at different times due to the effects of transmission delays. The transmitting or control chain is stepped over stepping lines SLOC and SLEC which are connected alternately to the odd and even-numbered stages, respectively. The receiving or indication counting chain at the office is controlled over stepping lines SLOI and SLEI which are similarly connected to the odd and even-numbered stages, respectively.

In FIG. 6, the operation of the counting chain at the station is illustrated. As was previously explained, the transmitting and receiving stages operate alternately in combination at this location. The priming condition flows from the transmitting stage to the corresponding receiving stage and then to the transmitting circuit of the succeeding stage. The stepping for the transmitting circuit portions is carried over stepping line FSLC, which is connected in multiple to each of the E–J1 circuits. The stepping pulses for the receiving circuits are carried over line FSLI, which is connected in multiple to the E–J2 circuits. Since stepping pulses are received alternately over these two stepping lines, alternate operation cascades throughout the combination station counting chain. In other words, alternate operation of the transmitting and receiving circuit stages of each of the chains occurs. Although the diagrammatic showing in FIG. 5 might indicate an alternate operation of corresponding transmitting and receiving circuits in the office chains, this does not normally occur due to the transmission delay time inherent in the carrier transmission. Alternate operation of the E–J1 and E–J2 circuits in corresponding stages would be coincidental, occurring only if the delay times were such as to effect such operation. However, since the operations of the E–J1 and E–J2 circuits are independent, each cascading sequentially through corresponding chains, alternate operation is not necessary.

As illustrated and described in connection with FIGS. 1 and 2, the counting chains must be reset at the end of each counting cycle. For the office chains, reset lines RL1 and RL2 are provided. These reset lines are connected in multiple to the transmitting and receiving chain stages, respectively, that is, to circuits E–J1 and E–J2, as shown in FIG. 3. It was previously mentioned that, although multiple reset action is illustrated, cascaded reset action in each separate chain may be alternately used if desired. Negative pulses are provided at the proper time over each of the reset lines to cause transistors TR2 and TR4 to again become conducting. Of necessity, transistors TR1 and TR3 at these times are transferred to their nonconducting condition. The source of the negative pulses will be explained in more detail later in connection with FIGS. 7 and 8. Referring to FIG. 4, in the station counting chain the reset line RL2, corresponding to the similarly designated line at the office and also originating in FIG. 8, resets the E–J1 circuits in multiple. In other words, the negative pulse supplied over reset line RL2 is applied to the base of transistor TR2 in each circuit E–J1, causing this transistor to become conducting, and, of necessity, the corresponding transistor TR1 to become nonconducting. Circuit E–J2 is then reset by a negative pulse originating at the collector of transistor TR1 and carried over auxiliary reset line RLA to the base of transistor TR4. This reset action thus occurs immediately after the reset of the corresponding circuit E–J1. This cascade reset action, as previously explained, may be further cascaded from stage to stage with other auxiliary reset lines being connected between the collector of each transistor TR3 and the base of transistor TR2 in the succeeding stage of the chain.

Referring again to FIG. 3, I shall now describe the selector circuit arrangement by which the transmission of functions is controlled. This circuit arrangement is shown in the lower portion of FIG. 3, and is connected to circuit E–J1 in office counting stage X at the collector of transistor TR2 through the scanning pulse line $SP_X$ and a capacitor CT. For convenience, this selector circuit arrangement is shown as connected to the illustrated office counting stage. However, a similar circuit arrangement is used at the station with similar connections to the transmitting circuit portion of each counting stage. This is illustrated in FIG. 4 by the connection SP taken from the collector of transistor TR2 of circuit E–J1 and ending in a conventional dotted line to indicate a standard connection similar to that shown in FIG. 3 for line SP. It is to be understood that a similar connection is made with each transmitting circuit stage of each counting chain. For the office transmitting counting chain, the similar connections $SP_{(X-1)}$ and $SP_{(X+1)}$ for the E–J1 circuits of the next preceding and succeeding stages are conventionally shown as connected to the selector bus S.

The connection $SP_X$ from the collector of transistor TR2 to bus S includes, in addition to capacitor CT, a control device CD. As shown in FIG. 1, each such device is a two-position control lever, manually operable between its two positions, in one of which it completes the circuit to bus connection S. One of these levers is shown conventionally in FIG. 3, designated again by the reference CD, as a connector which may be in an open circuit or a closed circuit position, the latter position being shown dotted in the drawing. At the station, this connector becomes a relay contact as shown in FIG. 2, the contact being normally open. The system operation requires that the position of each item of controlled apparatus be changed as a result of the position of the associated control device at the office being changed. Thus the function of each control device is to determine the use made of an output pulse obtained from the associated transmitting counting stage as the result of the condition of the Eccles-Jordan circuit being reversed. Depending upon whether a circuit path is provided for the output pulse supplied to a pulse line SP, the selector circuit shown in FIG. 3 causes one or the other of two carrier transmitters to transmit a pulse of carrier current over the communication channel. This carrier current pulse is of one of two carrier frequencies which serve as a first and second transmitted code. These frequencies, at the office, have been designated as frequencies $f1$ and $f2$ and each is characteristic of a prevailing condition of the control device being scanned by that transmitting stage. It is thus by the pulses obtained from the associated transmitting counting stage that the scanning of the control device position is accomplished. These pulses may be referred to for simplicity as transmitter scanning pulses.

Each scanning pulse line connected between an E–J1 circuit and the selector bus S includes similar components. One such component is a halfwave rectifier D2 which is poled to prevent intrusion into that line of negative pulses from the common bus line S. Each scanning pulse line SP includes the associated control device CD, previously described. Also included is a capacitor CT and a shunt path to ground connected to the common junction between device CD and capacitor CT. This shunt path includes a half-wave rectifier D3 which is poled to allow the dissipation of positive pulses to ground.

Provision of a selector line common to all transmitting stages permits the use of only a single selector circuit arrangement. The basis of this selector circuit is an Eccles-Jordan bi-stable circuit E–J3, of the same configuration as those previously described in connection with the composition of the various counting chain stages. The transistors in circuit E–J3 are designated, for convenient reference, as TR11 and TR12. Connected in parallel to the base of transistor TR12 are the selector bus line S and a pulse line ISL. In the form herein shown, pulses of positive potential are supplied over line ISL through resistance R30 at the same frequency as, and in synchronism with, the stepping pulses supplied over stepping lines SLEC and SLOC which control the alternate stages of the office transmitting counting chain. The positive pulses received over line ISL may be conveniently produced by inverting the stepping pulses supplied to lines SLEC and SLOC in any well-known manner. Since such inverters are known to the art, the details have not been shown in the present case. Connected between the collector of transistor TR11 and postive potential line LP is a resistance divider circuit formed by resistors R31 and R32. A similar circuit for transistor TR12 comprises resistors R33 and R34. From the intermediate junction point of each of these resistor networks are taken, respectively, lines L$f$1 and L$f$2 which lead to the corresponding carrier transmitters.

It will be recalled from the early description that, when the condition of circuit E–J1 of each transmitter counting stage is reversed, transistor TR2 of that circuit changes from a conducting to a nonconducting condition. As a result of this reversal, a negative scanning pulse is produced by capacitor CT which is connected to the collector of that transistor. If the control device CD is in the circuit closing position to complete the connection from line SP$_X$ to common bus S, the negative scanning pulse is obviously conducted to the selector bus line. Any dissipation of this scanning pulse to the inactive capacitors included in other SP lines, for example, line SP$_{(X+1)}$, is prevented by the provision of rectifier D2 in these other lines. The negative scanning pulse therefore becomes superimposed on the positive pulses supplied over line ISL through the obvious connections between the bus line S and the right-hand terminal of resistor R30.

This negative scanning pulse is contemporaneous with a positive pulse over line ISL since both originate from the same pulse generator. The circuit parameters are so designed that the amplitude of the scanning pulse exceeds, in the opposite direction, the amplitude of the positive pulse to a degree sufficient to assure that a negative potential is impressed upon the base of transistor TR12. Thus, if this transistor were previously nonconducting, its condition will now be reversed. In any event, in response to the reception of the negative scanning pulse in the selector circuit, a negative potential is supplied over line L$f$1 as a result of the negative potential at the collector of transistor TR11, which of necessity becomes nonconducting. Also, since transistor TR12 is in the conducting condition, no similar negative potential is supplied over line L$f$2. The carrier transmitters for the control codes are designed to transmit their respective carrier current only when supplied with negative potential over the corresponding line L$f$1 or L$f$2. Thus, when the negative scanning pulse from a particular stage such as stage X, as specifically shown, is conducted over line SP$_X$ and control device CD in its closed position to the selector circuit arrangement including circuit E–J3, a negative potential is supplied over line L$f$1 to the corresponding carrier transmitter and a pulse of carrier current of frequency $f$1 is transmitted.

The selector circuit arrangement being bi-stable, the condition in which a negative potential is supplied over line L$f$1 persists until a stage is reached in the course of the counting cycle when the scanning pulse is withheld from the selector circuit. Assuming that the control device associated with stage $(X+1)$ is in the position to interrupt line SP$_{(X+1)}$ so that the scanning pulse is not conducted to the selector circuit, the positive pulse over line ISL which coincides in time with the scanning pulse is then sufficient, in the absence of opposition by the scanning pulse, to cause a high positive potential at the base of transistor TR12. This causes transistor TR12 to become nonconducting and the condition of the selector circuit is changed to its other stable condition. Consequently, negative potential is supplied over line L$f$2 and not over L$f$1. Under this assumed condition, the negative potential supplied over line L$f$1 will have lasted only for the duration of a single step, that is, for the interval between the reversal of circuits E–J1 in stage X and stage $(X+1)$.

The shunt paths to ground connected to the various SP lines through the rectifiers D3 serve to dissipate rapidly the positive pulses produced by capacitor CT when transistors TR2 of circuits E–J1 are changed to the conducting condition upon resetting of a counting chain. These capacitors are thus rapidly discharged of a positive charge in readiness for the next scanning cycle. It is also to be noted, from FIG. 1, that no control device is associated with the final or "$n$" stage of the transmitting counting chain. Transistor TR12 of circuit E–J3 will thus become nonconducting at that time so that a negative potential is supplied over line L$f$2. At this time, however, as will be explained later, a negative potential is supplied from the reset control unit over auxiliary line LF1A. Negative potentials are therefore applied to both carrier transmitters and a pulse of carrier current is transmitted by each transmitter so that both carrier frequencies $f$1 and $f$2 appear on the communication channel for the reset pulse.

There is further provided, as part of the system, in conjunction with the counting chain, at both the office and the station, function registry stages. For convenience, a function registry stage X is shown in connection with the station counting stage X in FIG. 4. Preferably, in practice, each registry stage would be part of the standard circuit unit including also circuits E–J1 and E–J2 of the associated counting chain stage. There is one registry stage provided for each receiver counting chain stage. Since the operation and details of such registry stages are identical regardless of their location, the description of the registry stage shown in FIG. 4 in connection with the station counting chain will be sufficient for an understanding of all such stages.

For each of the receiver counting chain stages having an associated registry stage, a scanning pulse registry line SPR is connected from the collector of transistor TR4 of circuit E–J2 through a capacitor CR to two parallel gating circuits, each of which is of a two-state type. A shunt path to ground is connected between capacitor CR and the parallel gating circuits and includes a half-wave rectifier D4 which is poled to allow the dissipation of positive pulses from capacitor CR to ground. Resistors R40 and R41 are connected between capacitor CR and, respectively, transistors TR13 and TR14 of the first and second gating circuits. Between these resistors and the collectors of the respective transistors in the gating circuits, taps are connected through resistors R42 and R43 to the bases of transistors TR15 and TR16, respectively, of an Eccles-Jordan circuit E–J4. Circuit E–J4 is of the usual configuration for such Eccles-Jordan arrangements with the exception that an additional transistor TR17 is interposed between the emitter of transistor TR16 and ground bus connection LE. As is obvious, the connection from the emitter of transistor TR16 is connected to the base of transistor TR17 with the emitter of this latter transistor connected to line LE and its collector connected through the winding of a relay FS to negative potential line LN. The relay winding is shunted by a half-wave rectifier D5. This circuit arrangement will be more fully described shortly.

Continuing with the gating circuits, the emitters of transistors TR13 and TR14 are connected to line LE while the bases are connected through resistors R44 and R45, respectively, to positive potential line LP. The bases are also connected by receiving lines LR$f$1 and LR$f$2 to sources of negative potential within the carrier-receiver units at the station location. The full connections for lines LR$f$1 and LR$f$2 are shown in FIG. 2 as originating at receivers $f$1 and $f$2, respectively, from which they are connected in multiple to the gating circuits in the various station registry stages. The carrier receivers, which are of any well-known circuit arrangement, are so designed as to provide an output only in response to the absence of carrier current of the frequency to which the receiver is receptive through its associated filter. This output of the carrier receiver is in the form of a steady negative potential over the associated LR*f* line which is then used, as will be explained, to control the gating circuits of the associated registry stages. It is sufficient for an understanding of the operation of the registry stages to consider that, during any one period of the counting cycle, a negative potential is supplied over one or the other, but not both, of lines LR*f*1 and LR*f*2. This negative potential exceeds, in the opposite sense, the positive potential normally applied to the bases of transistors TR13 and TR14 from line LP. One of these bases thus has a negative potential while the other remains positive, so that one transistor is conducting while the other is nonconducting. Since no transmitted function is associated with the final stage of the receiving chain at either location, the effect of the combined two-frequency carrier current pulse used for reset control upon the operation of the gating circuits need not be considered.

It will be recalled from the previous description that, when the condition of circuit E–J2 of a counting stage is reversed, transistor TR4 of that circuit changes over from a conducting to a nonconducting condition. Consequently, a negative scanning pulse is produced by capacitor CR, which is connected to the collector of transistor TR4 through line SPR, in a manner similar to that in which a transmitter scanning pulse was produced by the reversal of circuit E–J1. The negative pulse appearing at the collectors of transistors TR13 and TR14 is conducted to ground at line LE by the one gating transistor which is conducting at that time. However, the negative pulse appearing at the collector of the nonconducting gating transistor is conducted through resistor R42 or R43, as the case may be, to the base of transistor TR15 or TR16, respectively, of circuit E–J4. Thus, it will be evident that, with negative potential supplied over line LR*f*1, the negative scanning pulse produced by capacitor CR will be conducted to ground by transistor TR13, but is blocked by transistor TR14. The negative potential pulse will thus appear through resistor R43 at the base of transistor TR16 which will become conducting if not already so, and, of necessity, transistor TR15 will be nonconducting. With the negative potential supplied over line LR*f*2, the scanning pulse will be applied to the base of transistor TR15 so that this transistor becomes conducting and transistor TR16 nonconducting. Therefore, the condition of circuit E–J4 depends upon the emission of a scanning pulse by an associated receiver counting stage and upon which of lines LR*f*1 and LR*f*2 is energized at negative potential at the time the scanning pulse appears at capacitor CR.

Referring for a moment to FIG. 3, if control device CD associated with office transmitting stage X is closed so that a negative potential is applied to line L*f*1, carrier transmitter *f*1 transmits a pulse of carrier current of that frequency. The corresponding absence of carrier current of frequenecy *f*2 will cause a negative potential to appear at the station on line LR*f*2. The reversal of circuit E–J2 of station counting chain stage X will then cause the scanning pulse to appear through resistor R42 at the base of transistor TR15 which then becomes conducting while its associated transistor TR16 of circuit E–J4 becomes nonconducting. If control device CD at the office occupies its open circuit position, a carrier current pulse of frequency *f*2 is transmitted. A negative potential thus appears on line LR*f*1 at the station. The negative potential scanning pulse from capacitor CR is applied only to the base of transistor TR16 which becomes conducting, transistor TR15 becoming nonconducting.

Normally, the operation of a relay is controlled in accordance with the state of each registry stage. For this purpose, transistor TR17 is inserted in the connection between the emitter of transistor TR16 and ground line LE. When the state of circuit E–J4 is such that transistor TR15 is conducting and therefore transistor TR16 is nonconducting, negligible current flows through the latter transistor and hence to the base of transistor TR17. This latter transistor therefore is nonconducting and the winding of relay FS is not energized. However, when the opposite condition of circuit E–J4 occurs, transistor TR16 conducts sufficient current to the base of transistor TR17 to cause this latter transistor to conduct. Current then flows between bus lines LE and LN through the transistor and the winding of relay FS, which is thus energized. Rectifier D5 is so poled in a shunt path around the winding of relay FS to act as a surge absorber for the energy in the relay winding when it becomes deenergized by the change of transistor TR17 from a conducting to a nonconducting condition.

Restating the registry operation in another manner, it is obvious that energization of relay FS becomes possible only when negative potential is supplied from carrier receiver *f*1 over line LR*f*1 at the time that circuit E–J2 of station counting stage X reverses and emits a scanning pulse through capacitor CR to the gating circuits. Under these conditions, transistor TR16 is supplied with negative potential at its base and becomes conducting. The registry stage associated with each office receiving chain stage is identical with registry stage X shown in FIG. 4 with the exception that, as indicated in FIG. 1, negative potentials from carrier receivers *f*3 and *f*4 are supplied over lines LR*f*3 and LR*f*4, respectively, to the gating circuits. In addition, the indication relays at the office are designated by the reference character K. As may be seen by comparison, a particular relay K is energized when the relay contact associated with the corresponding station counting stage is open. If the contact is closed, relay K is deenergized.

Frequency divider No. 1, associated with the office transmitting or control counting chain as shown in FIG. 1, is illustrated in detail in the upper portion of FIG. 7. Input to this frequency divider, and to other frequency dividers, is over the stepping generator line SG and through the capacitor C3. Line SG originates at the master stepping generator at the office, which may be in the form of a multivibrator using transistorized circuits. Such multivibrator circuit arrangements are well known and thus are not shown in the present application. The output of the multivibrator is preferably in the form of a square wave so that the negative potential portions thereof may be applied through line SG and capacitor C3 to the various frequency dividers. However, other forms of output from the master stepping generator may be used and other circuit arrangements interposed in line SG to convert the wave form into a square wave. The frequency of the output of the master generator is at some selected multiple of the desired stepping rate of the various counting chains, as was previously explained. For purposes of the present description, it is assumed that the input to frequency divider No. 1, shown in FIG. 7, over line SG is a series of negative potential pulses at the output frequency of the master stepping generator, which is a multiple of eight times the desired chain stepping rate.

The frequency divider as shown in FIG. 7 is in the form of a binary counting chain having a selected number of transistorized bi-stable circuit arrangements of the Eccles-Jordan type. These bi-stable circuits are connected in cascade to form the chain which is thus adapted to register in binary form pulses applied over a single input circuit to the first bi-stable circuit stage. The condition of the first bi-stable circuit is reversed by each of the applied pulses while succeeding E–J circuits in the counting chain reverse their conditions only once for every two reversals of the immediately preceding stage, this manner of counting being of itself well known. Because of the necessity of having two stepping outputs to drive each counting chain, the frequency dividers here used have one additional counting stage above that required for the actual desired count in each cycle. Since the master stepping generator output frequency is assumed to be the multiple of eight times the desired stepping rate of the counting chains, the frequency divider circuits must have a stepping output for each eight input pulses. Although three E-J circuits in the binary counting chain would provide the count of eight, a fourth E-J circuit arrangement is required in order that odd and even output pulses may be obtained. This will appear more clearly as the description develops.

Each E-J circuit arrangement of the frequency divider comprises two transistors designated in the first such circuit arrangement TR7 and TR8. Similar designations are used for the transistors in the other E-J circuit arrangements, but with appropriate prefixes to distinguish the stage of the counting chain in which employed. It is to be noted that the reference characters used for resistors, capacitors, etc., employ similar prefixes. It is also to be noted that this frequency divider is similar to the binary counting arrangement shown in FIG. 7 of the aforementioned copending application Serial No. 815,647. Referring to the first E-J circuit arrangement, the pulse stepping resistance arrangement comprising resistors R5 and R6, in parallel, is connected to the bases of transistors TR7 and TR8, respectively. The common connection at the other terminal of the resistors is connected to capacitor C3 through which the input pulses are received over line SG. The usual cross couplings between the transistors of the E-J circuit arrangement include capacitors C4 and C5 connected in multiple with the conventional resistors to insure stability of circuit operation. The interstage couplings which extend between the collector of transistor TR8 in one circuit to the stepping resistance arrangement of the next circuit stage include a capacitor C6, a rectifier D6 poled to oppose the application of positive pulses to the succeeding stepping resistance arrangement, and a shunt path to ground line LE through resistor R4. This latter resistor may, if desired, be replaced by another half-wave rectifier poled to allow positive pulses to be shunted to ground. Each interstage coupling is similar in composition and the various elements are designated by reference characters similar to those already discussed with proper prefixes to distinguish the location in the frequency divider arrangement.

It is assumed that initially, before any counting begins, transistor TR7 in each of the stages of the frequency divider is in a conducting condition and transistors TR8 are therefore nonconducting. The application of a negative pulse to capacitor C3 produces a negative pulse in the stepping resistor arrangement R5, R6 of the first stage. This pulse will have no effect on the base of transistor TR7 since this point is already negatively biased. The pulse, however, will change the base of transistor TR8 to a negative bias so as to cause this transistor to become conducting. Over the usual cross coupling, a positive transfer pulse is applied to the base of transistor TR7 to cause it to become nonconducting. The capacitors, specifically capacitor C5 in this action, in the cross coupling connections insure that such a positive transfer pulse is of greater duration than the negative pulse produced through capacitor C3 from the stepping generator. The positive transfer pulse will, however, have decayed before the next negative pulse is applied through capacitor C3, so that this next negative pulse will have the effect of causing the E-J circuit to revert to its initial condition with transistor TR7 conducting.

In response to the second negative pulse from the stepping generator, and in response to each alternate or even-numbered negative pulse thereafter, transistor TR8 becomes nonconducting, as previously indicated. There is therefore produced by capacitor C6 a negative potential pulse which is passed through rectifier D6 to the stepping resistance arrangement of the second E-J circuit of the frequency divider. It is to be noted that the positive pulse produced in capacitor C6 when transistor TR8 becomes conducting is shunted to ground through resistor R4 and line LE. When this negative pulse is applied to the resistor arrangement including resistors 2R5 and 2R6, the negative potential applied to the base of transistor 2TR8 causes this transistor to become conducting, thus reversing the condition of the second E-J circuit arrangement of the frequency divider. When the first E-J circuit arrangement has completed two more condition reversals, a negative pulse once again is applied to the bases of the transistors in the second E-J circuit so that transistor 2TR7 again becomes conducting. This causes a negative pulse to be developed through capacitor 2C6 and applied through rectifier 2D6 to the stepping resistor arrangement for the third E-J circuit which then reverses its condition, transistor 3TR8 becoming conducting. In other words, for a second change of condition of the second E-J circuit including transistors 2TR7 and 2TR8, and each succeeding alternate change thereafter, a change in condition is brought about in the third circuit. A similar operation occurs between the third and fourth E-J circuits. Stated in another way, each two condition changes in any one E-J circuit stage of this frequency divider produces a single condition change or reversal in the next succeeding E-J circuit stage of the four such stages here provided.

FIG. 7 also includes, in connection with the details of frequency divider No. 1, the apparatus by which the counting chains may be stepped through their various cycles. This is shown in FIG. 7, for convenience, in connection with the office transmitting chain action. However, the stepping of the other counting chains is controlled in a similar manner and may be understood with the single explanation which follows shortly. It is obvious from the preceding description of the operation of the frequency divider that, when a continuous sequence of negative pulses is provided from the master stepping generator, the fourth E-J circuit stage of the divider reverses every eight counts, that is, every eighth input pulse through capacitor C3. At the end of the first eight-count, transistor 4TR7 becomes nonconducting so that its collector assumes a negative potential equivalent or very nearly equivalent to the negative potential on line LN. At the end of the second eight-count of the frequency divider, the fourth E-J circuit stage again reverses its condition so that transistor 4TR8 becomes nonconducting and its collector assumes the negative potential. This reversal of the condition of the fourth stage alternates on every eight-count thereafter so that negative potentials are applied alternately to stepping pulse lines OSP and ESP at the end of the odd and even-numbered counting cycles, respectively, of the frequency divider. These negative potentials supplied alternatively over lines OSP and ESP cause negative pulses to be developed alternatively in capacitors CSP and 2CSP associated, respectively, with pulse generators SPG1 and SPG2, shown in the lower left of FIG. 7.

Each of these pulse generators in FIG. 7 is similar to those shown in FIG. 4 of the previously mentioned copending application Serial No. 710,718. Similar reference characters are again used for easy comparison so that stepping pulse generator SPG1 includes transistors TR5 and TR6, while stepping pulse generator SPG2 includes transistors TR9 and TR10, each also including certain resistors, capacitors, and a rectifier. In pulse generator SPG1, transistors TR5 and TR6 have their collectors connected through resistors R21 and R22, respectively, to negative potential line LN. The collectors of transistors TR9 and TR10 of the second pulse generator are similarly connected to line LN through resistors R26 and R27, respectively. The emitters of transistors TR5 and TR9 are connected directly to ground through line LE, while the emitters of transistors TR6 and TR10 are connected to positive potential at line LP through resistors R23 and R28, respectively. The bases of transistors TR5 and TR9 are held at a normally positive potential by the resistor networks R19, R20 and R24, R25, respectively. As previously indicated, the bases of these two transistors are also connected to receive the pulse output of capacitors CSP and 2CSP, respectively, these capacitors in turn being connected to the collectors of the transistors in the final E–J circuit stage of the frequency divider. The base of transistor TR6 is connected to the junction point between a capacitor CP and a half-wave rectifier D1 which are connected in series between the collector of transistor TR5 and positive potential line LP, the rectifier being so poled as to conduct only in the direction from the capacitor to line LP. Similar connections are provided for the base of transistor TR10 through capacitor 2CP and rectifier 2D1.

Due to the alternate positive and negative potentials applied to the base of transistor TR5 in the first pulse generator, this transistor is caused to be alternately conducting and nonconducting for periods of approximately equal duration. Consequently, the potential of its collector alternates between ground or zero potential and a value approaching the full negative potential of line LN. The positive pulse which is produced by capacitor CP when ground potential prevails on the collector of transistor TR5 is shunted to line LP through rectifier D1, the normally nonconducting condition of transistor TR6 remaining unaffected. Even for the most part of the period when approximately full negative potential exists at the collector of transistor TR5, the normal state of transistor TR6 is unaffected. In this normal state, transistor TR6 has at its emitter a value of positive potential approaching that of line LP to provide a normal positive potential over stepping line SLOC connected directly to the emitter of this transistor.

However, the negative pulse produced by capacitor CP over a brief initial portion of the period when approximately full negative potential exists at the collector of transistor TR5 is impressed on the base of transistor TR6. This pulse is of sufficient amplitude to cause transistor TR6 to become conducting, whereupon the potential at its emitter and hence over line SLOC falls momentarily, the extent of the drop being determined by the resistor divider circuit R22, R23. The values of these resistors are so interrelated that the drop is approximately to zero potential. Thus the stepping pulse introduced into line SLOC for each alternate counting cycle of the frequency divider takes the form of a momentary interruption of an otherwise steady positive potential. The operation of pulse generator SPG2 is similar and believed to be obvious when taken in connection with the drawings and the preceding description. A normally positive potential is applied over stepping line SLEC connected to the emitter of transistor TR10 except for momentary interruptions when transistor TR10 becomes conducting. The drop in potential in line SLEC is controlled by the resistor network R27, R28 so that the drop is also approximately to zero potential. Stepping lines SLOC and SLEC thus alternately are provided with pulses during which the potential of the line drops to approximately zero, these pulses being applied to the alternate stages of the transmitting counting chain at the office, as shown in FIGS. 3 and 5.

The parenthetical reference characters SLOI and SLEI also associated with these stepping lines are those reference characters which are pertinent in connection with similar stepping pulse generators used to control the alternate stages of the receiving or indication counting chain at the office, as also shown in FIGS. 3 and 5. In each of these reference characters thus far mentioned in connection with these stepping lines, "O" indicates the connection to the odd-numbered stages and "E" the connection to the even-numbered stages of the control (C) or the indication (I) chains. The second set of parenthetical reference characters associated with these stepping lines designate the field or station stepping lines FSLC and FSLI which control the transmitting (C) and receiving (I) stages, respectively, of the station counting chain as indicated in FIGS. 4 and 6. With this explanation, it is believed to be unnecessary to repeat the detailed circuit description for the stepping pulse generators SPG1 and SPG2 which are connected with the other counting chains of the system, that is, the office indication counting chain and the station combination counting chain.

The reset control circuit arrangement for the office transmitting chain is shown in the lower right portion of FIG. 7. This control unit consists of an Eccles-Jordan circuit E–J5 and an AND circuit No. 1. In order to avoid premature or incorrect reset at the station by a momentary overlap of pulses of carrier current of both frequencies, which condition is used for the actual reset pulse from the office to the station, resetting circuits are arranged so that reset occurs only upon reception of a reset pulse having a minimum length of ¼ of a single stepping period of the counting chain. This operation will be more completely described shortly. However, the reset control unit is arranged to provide a reset pulse with a length of ¾ of a count step period.

Circuit E–J5 includes transistors TR23 and TR24 with the usual configuration of cross coupling resistor connections. Each collector is connected through a resistor to negative potential line LN and both emitters directly to ground line LE. The base of transistor TR24, in addition to being connected through a resistor to positive potential line LP, is connected through resistor R35 to a common connection of the collectors of transistors TR21 and TR22 which comprise the No. 1 AND circuit. The collectors of these two transistors of the No. 1 AND circuit are also connected in common through resistor R36 to negative potential line LN. The base of transistor TR23, in addition to its connection to line LP, is connected through resistor R37 to the scanning pulse line $SP_n$ which is connected to the collector of transistor TR2 of the final stage of the office transmitting counting chain, similar to line SP shown in FIG. 3. When reversal of the conducting condition of circuit E–J1 of transmitting stage $n$ at the office occurs, the negative potential on line $SP_n$ causes transistor TR23 to become conducting and of necessity transistor TR24 becomes nonconducting so that its collector assumes a potential nearly equal to the negative potential of line LN. This negative potential is carried through resistor RR1 and the reset line RL1 to the stages of the office transmitting counting chain in multiple to effect a reset action to the normal condition in all these stages. In addition, through the resistance divider network including resistors R38 and R39, a negative potential is supplied over line LF1A, which is connected to carrier transmitter $f1$ at the office, to cause the transmission of a pulse of carrier current of frequency $f1$ in combination with the usual current pulse of frequency $f2$ to provide a reset pulse for the station location. This reset pulse is terminated when transistor TR24 becomes conducting upon the application of a negative potential to the base of this transistor from the collectors of the transistors of the No. 1 AND circuit. Prior to the application of this negative potential to transistor TR24, the negative potential on line $SP_n$ terminates when stage $n$ is reset, so that circuit E–J5 may reverse to its original condition with transistor TR24 conducting.

Both transistors of the No. 1 AND circuit are initially conducting under the influence of negative potentials supplied to the bases of these transistors over lines P2/6 and P4 from the collectors of transistors 2TR8 and 3TR8, respectively, of the frequency divider. These connections to the bases of transistors TR21 and TR22 from the frequency divider include resistances R46 and R47, respectively. The connections from the bases of these transistors to positive potential line LP are carried through resistances R48 and R49 which are adjusted to allow the negative potential from the frequency divider to be the controlling potential under normal conditions. During each cycle of operation of the frequency divider, that is, during each count of eight, the collector of transistor 2TR8 becomes positive when the transistor becomes conducting on count two and on count six. Conversely, transistor 2TR8 becomes nonconducting on counts four and eight, at which time its collector assumes a negative potential. In other words, the potential applied over line P2/6 from the frequency divider reverses every second count entered into the frequency divider, being negative during the initial two counts of each cycle of operation. The collector of transistor 3TR8 has a positive potential during the last four counts of each series of eight counts by the frequency divider, that is, from count five to count eight. Since transistor 3TR8 becomes nonconducting at count eight, a negative potential is applied from its collector over line P4 until the fourth count of the next cycle.

Thus in the operation of the No. 1 AND circuit, transistor TR21 has a positive potential applied to its base at the second count and becomes nonconducting. On the fourth count, a negative potential is again applied to the base so that transistor TR21 becomes conducting, reversing again at the sixth count when the positive potential is again applied to the base. Meanwhile, transistor TR22 remains conducting during the first four counts of the frequency divider cycle of eight counts and changes to a nonconducting condition on the fourth count when positive potential is supplied over line P4 to its base. At the beginning of a count cycle with both transistors TR21 and TR22 conducting, each collector and thus the lower terminal of resistor R36 assumes a potential approximately that of line LE, the zero or ground potential. When transistor TR21 becomes nonconducting on the second count by the frequency divider, transistor TR22, which remains conducting, holds the lower terminal of resistor R36 at the zero potential of line LE. On the fourth count, transistor TR21 again becomes conducting, at the same instant that transistor TR22 becomes nonconducting, and retains the zero potential at the lower terminal of resistor R36. However, on the sixth count, when transistor TR21 again becomes nonconducting, both transistors of the No. 1 AND circuit are nonconducting and the lower terminal of resistor R36 assumes the approximate potential of negative line LN. This negative potential is applied through resistor R35 to the base of transistor TR24 of circuit E–J5, causing this transistor to become conducting and restoring the initial condition of the Eccles-Jordan circuit.

Reviewing briefly, circuit E–J5 reverses its condition at the end of a count cycle of the frequency divider when the final stage of the office transmitting chain is reversed to place a negative potential on line SP$_n$. This condition of circuit E–J5 holds into the following count cycle of the frequency divider, whose operation is continuous. Thus the reset potential continues to be applied to lines RL1 and LF1A from the collector of transistor TR24. However, at the ¾ length point in the count cycle of the frequency divider, that is, at the end of the sixth count, the negative potential applied to the base of transistor TR24 again reverses circuit E–J5 so that transistor TR24 becomes conducting and its collector assumes a zero potential and the reset pulses are terminated. By this operation of the reset control unit, including circuit E–J5 and the No. 1 AND circuit, the reset pulse is made ¾ of a counting period in length as required by the system operation.

Frequency divider No. 2 which is used for the office receiver chain is shown at the top of FIG. 8. With certain modifications, this frequency divider arrangement may also serve as an illustration of the frequency divider at the station location. The major modification necessary, as will be discussed hereinafter, is the elimination of the final or fourth stage of the frequency divider chain. Considering frequency divider No. 2 as used for the office receiver chain, the structure and the operation of the arrangement is similar to that shown and described for frequency divider No. 1 in FIG. 7. For this reason and to simplify the understanding and cross reference between the two frequency divider illustrations, similar reference characters have been used where appropriate to allow a quick comparison and reference between the two circuit arrangements.

Although not shown in connection with FIG. 8, the office receiver chain requires two stepping pulse generators which are identical in construction with pulse generators SPG1 and SPG2 shown in FIG. 7 for the office transmitting chain. The two pulse generators for the receiver chain are controlled over the connections 2OSP and 2ESP which are connected, as shown conventionally, to the collectors of transistors 4TR7 and 4TR8, respectively, of the fourth stage of frequency divider No. 2. During the operational description which follows later, when reference to the pulse generators for the office receiving chain are necessary, the illustrations in FIG. 7 of generators SPG1 and SPG2 will be used with proper cross reference to show the actual connections. Connected to the collectors of transistors 3TR7 and 3TR8 of stage 3 of the frequency divider are line connections FOSP and FESP which are shown by conventional dotted lines. These connections illustrate one other modification necessary at the station location in the frequency divider arrangement and serve as connections to control the pulse generators necessary for driving the station counting chain, these pulse generators also being similar in construction to the ones shown in FIG. 7. The connections are made to the third stage of the station frequency divider chain in order that the stepping count at the station will have double the frequency of the similar count at the office. This is required since the station chain, making use of the standard units, serves as a combination transmitting and receiving chain that must operate at twice the office cyclic rate. This will be more fully explained during the operational description. Also necessary at the station is a reset control arrangement similar to that shown in the lower right of FIG. 7. The necessary connections from the station frequency divider to such a reset control unit and the operation thereof will be included hereinafter at the proper time.

Frequency divider No. 2 differs from the divider No. 1 in its reset or synchronizing connections. It will be remembered that frequency divider No. 1, once its operation is initiated, continuously operates in recurring cycles to provide an output pulse to one or the other of the stepping generators every eighth cycle of the master stepping generator output. However, the frequency divider for the receiving chain must be periodically reset, with a proper preselected condition, to compensate for the transmission delays inherent in the communication channel. This reset and its preselected conditioning must be properly timed to phase the response of the receiving chain with the function reception. In other words, the response of each stage of the receiving chain, to condition the associated registry stage for reception, must be midway in the period during which the reception of the equivalent function transmission from the station occurs. Thus the reset of this frequency divider No. 2 must enter a preselected count condition into the divider chain which will effect the proper timing of the chain response. Toward this result, reset connections are made through half-wave rectifiers D7 (each properly prefixed to differentiate between the stages of the divider) to the bases of transistors TR7, 2TR8, 3TR8 and 4TR8. These connections serve to apply a resetting or synchronizing pulse developed in the synchronizing and reset delay arrangement at the bottom of FIG. 8 to the selected transistors in the divider chain for reset and conditioning. This will be fully explained in the following description. Briefly, the simultaneously applied reset pulse causes the transistors to which the reset connections are made to become conducting. It is obvious that if transistors TR7, 2TR8, 3TR8 and 4TR8 are conducting in the preselected preliminary condition, two reversals of the first stage, under the influence of the master stepping generator pulses applied through capacitor C3 to the first stage E–J circuit, will cascade throughout the chain to circuit E–J4 to reverse this circuit for a final count and condition the divider to initiate an odd-count cycle. This immediately following count cycle results in an output pulse over line 2OSP which feeds through the proper pulse generator into the receiving chain to start the new cycle of counting. It is believed that the basic operation of the arrangement of frequency divider No. 2 is obvious when taken in connection with the already provided description of the operation of the similar frequency divider No. 1. Accordingly, I shall now continue with the description of the synchronizing and reset delay arrangement which controls the synchronizing of frequency divider No. 2 at the end of each counting chain operation.

This synchronizing and reset delay control circuit arrangement is shown at the bottom of FIG. 8 and comprises various circuit portions which will now be described in detail. I shall start with the portion designated as the No. 2 AND circuit which comprises transistors TR18 and TR19. The collectors of these two transistors are connected together and thence through a common resistor R29 to negative potential line LN. Each emitter is connected directly to ground or zero potential line LE and the bases are connected through resistors to positive potential line LP for the purpose of providing bias voltages. The bases of transistors TR18 and TR19 are also connected through resistors R50 and R51, respectively, to carrier receiving lines LRf3 and LRf4, respectively. By reference to FIG. 1, it can be seen that these line connections originate at the respectively numbered carrier receivers at the office location and thus are responsive to the carrier pulses transmitted from the station, these carrier pulses being pulses of carrier current of frequencies f3 and f4. It will be remembered that a negative potential output from the receiver is applied to lines LRf3 and LRf4 only when the corresponding receiver is not receiving carrier current of the associated frequency over the communication channel. At other times, that is, when carrier current is received by a receiver through its associated filter, a positive potential is applied to the corresponding output line.

During normal operation of transmitting indications from the station, only one carrier current pulse is transmitted at a time. Thus one or the other of lines LRf3 and LRf4 will always have a negative potential applied thereto. This negative potential applied to the base of the associated transistor is sufficient to overcome the bias voltage from line LP and cause the transistor to become conducting. Thus the common collector connection of these two transistors TR18 and TR19, that is, the lower terminal of resistor R29 by which they are connected to line LN, is normally at a zero or ground potential level. However, during the reset or synchronizing pulse transmitted from the station, both carrier frequencies are transmitted and received, one by each receiver, so that both lines LRf3 and LRf4 have positive potentials applied thereto. With positive potential applied to the bases of both transistors of the No. 2 AND circuit, the transistors become simultaneously nonconducting and their common collector connection, the lower terminal of resistor R29, is transferred to nearly the full negative potential level of line LN. Since the station location is provided with a reset control arrangement similar to that used in connection with the office transmitting chain, the length of the reset pulse from the station is ¾ of the length of a single counting chain step period. Thus the negative potential condition of the collectors of transistors TR18 and TR19 continues for this period during the reset pulse.

From previous discussion, it is to be recalled that, during the normal transmission of indication functions from the station, successive carrier current pulses which may be of different frequencies may slightly overlap during reception at the office. There may thus be very short overlap periods during which lines LRf3 and LRf4 both have positive potentials during normal operation. However, this period during which the collectors of the transistors of No. 2 AND circuit will simultaneously have a negative potential is very short. Other circuits of the synchronizing and reset delay arrangement, as will appear shortly, eliminate such brief overlap pulses in establishing the proper time for the synchronizing action.

This negative potential appearing at the collectors of transistors TR18 and TR19 is applied as a negative potential pulse through capacitor C7 to the base of transistor TR25 which is part of the synchronizing pulse generator No. 1. This negative pulse is of sufficient negative potential to overcome the positive bias applied to the base of transistor TR25 from positive line LP through resistor R52. Transistor TR25 has its collector connected to negative line LN through resistor R54 and its emitter, in common with the emitter of the second transistor TR26, connected to positive potential line LP through resistor R53. The negative pulse previously mentioned is sufficient to cause transistor TR25 to become conducting. The resulting rise in the potential level of its collector from negative to a zero potential causes a relative positive pulse to be transmitted through capacitor C8 to the base of transistor TR26. This relative positive pulse is sufficient to overcome the negative bias through resistor R55 normally applied to the base of this transistor, and causes transistor TR26 to become nonconducting. The potential of its collector then changes to nearly the negative potential of line LN, to which it is connected through resistor R56. The negative potential now appearing on the collector of transistor TR26 is translated as a negative pulse through capacitor C9 to a reset line RL3, which will be more fully explained later. Positive pulses appearing at capacitor C9 are conducted to ground line LE through resistor R57 in order to eliminate any undesired result therefrom. Because of the use of capacitors C7, C8, and C9, the output pulse from this pulse generator is of relatively short duration, after which the circuit arrangement returns to its initial condition.

The negative potential appearing at the collectors of transistors TR18 and TR19 is also passed through variable resistor R58 to the base of transistor TR20 which serves as a phase inverter. The base of this latter transistor is also connected to line LP through resistor R59 which is shunted by capacitor C10. The emitter of transistor TR20 is connected directly to line LE while its collector is connected to line LN through resistor R60. The collector of transistor TR20 is also connected through resistor R61 to the base of a transistor TR29, to be described shortly. Under normal conditions, that is, when either of transistors TR18 and TR19 is conducting, the resistance divider network including resistors R29, R58 and R59 is so proportioned that a positive potential appears at the base of transistor TR20 which is thus in the nonconducting condition. The negative potential then appearing at the collector of transistor TR20 is sufficient to condition transistor TR29 to be conducting.

When the collectors of transistors TR18 and TR19 become simultaneously negative, the change in potential level at the lower terminal of resistor R29 affects the resistor divider network R58, R59 to the extent that the potential changes to negative at the base of transistor TR20, which then becomes conducting. However, the rate of this change is governed by capacitor C10 whose charging time is established by variable resistor R58 to preselect the charging time to be in excess of the period of overlap of frequencies f3 and f4 which may occur during normal indication transmission. This prevents transistor TR20 from improperly conducting during such overlap periods. However, actual reset pulses are of such length that the negative potential at the lower terminal of resistor R29 exists for a sufficient period for the base of transistor TR20 to become sufficiently negative in potential to cause conduction. In actual practice, this charging time for capacitor C10 is such that the reset pulse must be greater than ¼ of the length of a counting chain stepping period. In other words, the reset pulse received must exceed two cycles of the output of the master stepping generator to permit transistor TR20 to become conducting. As previously mentioned, the possible overlap of carrier frequencies f3 and f4 during normal indication transmission is of insufficient duration to permit this change in the condition of transistor TR20. It will be noted that a half-wave rectifier D8 connected in multiple with resistor R58 permits the rapid application of a more positive potential from the collectors of transistors TR18 and TR19 to the base of transistor TR20 to hold this transistor nonconducting, or to immediately cause it to become so, when either transistor TR18 or TR19 again conducts. When transistor TR20 becomes conducting, its collector assumes a relative zero potential which is carried through resistor R61 to the base of transistor TR29. The result of this relatively positive rise in potential upon the condition of transistor TR29 will be discussed hereinafter in more detail.

At the left of the synchronizing and reset delay arrangement is a single stage of binary counter including transistors TR7A and TR8A. The circuit arrangement and elements of this binary counter stage are identical with those used in any one of the stages of frequency divider No. 2 or of frequency divider No. 1, previously described. This binary counter stage is arranged to follow the master stepping generator pulses which are carried over line SG and through capacitor C3A to the resistance balancing network including resistors R5A and R6A, and thus applied to the bases of the two transistors. It is obvious, when taken in connection with the previous description, that this binary counter stage continuously follows the pulses from the master generator alternately reversing its condition on each cycle of this input so that transistors TR7A and TR8A are alternately conducting. This binary counter is reset to its normal condition, that is, with transistor TR7A conducting, by the negative potential pulse transmitted from synchronizing pulse generator No. 1 through capacitor C9, line LR3, and rectifier D7A in its reverse direction to the base of transistor TR7A. It will be remembered that this negative pulse occurs as a result of the bases of transistors TR18 and TR19 of the No. 2 AND circuit becoming negative as a result of the synchronizing pulse from the station. Since this pulse applied to the base of transistor TR7A is of short duration, this binary counter stage immediately renews its cyclic operation to follow the pulses from the master stepping generator. The second cycle of this master stepping generator output following the reset pulse causes transistor TR8A to become nonconducting so that a negative potential appears at its collector. This results in the transmission of a negative potential pulse through capacitor C6A and rectifier D6A in its reverse direction to the base of one of the transistors of the gate circuit arrangement immediately to the right of the binary counter stage. The positive pulses appearing at capacitor C6A when transistor TR8A is conducting are blocked by rectifier D6A and are conducted to ground line LE through resistor R4A, this operation being similar to that occurring in any single stage of the frequency divider arrangements. The negative pulse applied to the gate circuit appears nearly simultaneously with the initial reception of the reset or synchronizing pulse from the station location.

The gate circuit arrangement includes transistors TR27, TR28 and TR29. The first two of these transistors are connected in an arrangement similar to the Eccles-Jordan circuit arrangement, and operation is similar thereto. An inspection of the circuit shown in FIG. 8 will confirm this arrangement, the collectors of transistors TR27 and TR28 each being connected to negative line LN through resistors, the emitters direct to ground line LE, and the bases to positive line LP through resistors. Cross connections are made from the collector of each transistor to the base of the other transistor. The positive potential bias applied to the base of transistor TR27 from line LP is arranged to be sufficient, in the absence of any negative pulse applied to the base, to cause the transistor to become nonconducting. By the cross coupling, transistor TR28 under these conditions becomes conducting. This is the normal condition of the transistors TR27 and TR28, that is, the former nonconducting and the latter in the conducting condition.

The emitter of transistor TR29 is connected directly to line LE and the collector is connected in common with the collector of transistor TR28, and through the common resistor to line LN. The base of transistor TR29 is biased positive by connection through resistor R62 to line LP. However, the negative potential normally applied from transistor TR20 through resistor R61 to the base of transistor TR29 is sufficient to cause this latter transistor to be conducting, so that its collector is at zero potential. Thus the common connection between the collectors of transistors TR28 and TR29 is normally at zero potential, especially with both transistors conducting.

As described in preceding paragraphs, each second cycle of the master stepping generator output causes the application of a negative potential pulse through capacitor C6A from transistor TR8A to the base of transistor TR27. This pulse is of sufficient negative potential to cause transistor TR27 to become conducting. Of necessity, by the cross coupling arrangement, transistor TR28 under these conditions becomes nonconducting so that its collector would normally be at a negative potential approximately equal to that of line LN. In other words, each second cycle of the master stepping frequency, a gate arrangement is opened whereby the collector of transistor TR28 becomes negative to prepare a synchronizing pulse if other conditions are proper. The second necessary condition for this synchronizing pulse is the nonconducting condition of transistor TR29, which is the reverse of its normally conducting condition. As was previously explained, if the synchronizing pulse received from the station is of sufficient length, transistor TR20 becomes conducting so that the normally negative potential of its collector is changed to a zero potential. This is applied to the base of transistor TR29. The positive bias from line LP through resistor R62 applied to the base of transistor TR29 is sufficient under these conditions to cause this transistor to become nonconducting. This condition, if a proper reset pulse is received from the station, occurs at approximately the same time that transistor TR28 becomes nonconducting at the end of the second cycle of the master stepping frequency as counted by the binary counter stage. The negative potential at the common collector connection of transistors TR28 and TR29 resulting from the simultaneous nonconducting condition of the transistors is applied through capacitor C11 to the base of transistor TR30 which is part of the synchronizing pulse generator No. 2.

Reviewing briefly the operation which provides this pulse through capacitor C11, the reception of a reset or synchronizing pulse from the station results in a negative potential at the common collector connection of transistors TR18 and TR19 of the No. 2 AND circuit. This negative potential results in a negative potential pulse into the synchronizing pulse generator No. 1 which in turn causes the transmission of a negative pulse over line RL3. This resets the binary counter stage to its normal condition after which it immediately follows the input from the master stepping generator. At the end of two cycles of this input at the master stepping frequency, a negative potential pulse is originated and passed through capacitor C6A into the gate circuit. Meanwhile, if the synchronizing pulse from the station is of sufficient length, phase inverter transistor TR20 is changed from its normal nonconducting condition to a conducting condition at the end of a time period which is approximately equal to, but not less than two cycles of the master stepping frequency. Obviously, the reset pulse, of necessity, must exceed this time period to be effective. The gate circuit arrangement including transistors TR27 and TR28 having thus opened the gate, the nearly simultaneous transfer of transistor TR29 from a conducting to a nonconducting condition, as a result of the zero potential appearing at the collector of transistor TR20 and thus on the base of transistor TR29, causes the common collector connection between transistors TR28 and TR29 to assume a negative potential. Thus, this negative potential condition exists at this point only if the reset condition is of sufficient length to exceed at least two cycles of the master stepping frequency, that is, ¼ of a normal count step period, and is not merely a temporary overlap of the two indication carrier frequencies.

Transistors TR30 and TR31 form a synchronizing pulse generator No. 2 which is similar in connections and structure to that described for the synchronizing pulse generator No. 1 at the extreme right of the synchronizing and reset delay arrangement. The operation of this second synchronizing pulse generator is identical with that for the first unit already discussed. Thus the negative pulse applied to the base of transistor TR30 through capacitor C11 results immediately in a negative pulse being transmitted through capacitor C12 as a result of the negative potential appearing at the collector of transistor TR31. This pulse is applied through the previously described reset circuit, including rectifiers D7, 2D7, 3D7 and 4D7, to frequency divider No. 2. This negative pulse applied through these rectifiers to the bases of the associated transistors causes the frequency divider to reset to the preselected count condition which is the equivalent of its condition at the end of the usual sixth count in the total count of eight. The positive pulse appearing at capacitor C12 when synchronizing pulse generator No. 2 resets to its normal condition is blocked by these rectifiers and is conducted through a resistor to line LE. The negative potential appearing at the common collector connection of transistors TR28 and TR29 is also carried through resistor RR2 to line RL2 to reset the receiving chain stages at the office as shown in FIG. 3. As will appear when this synchronizing and reset delay arrangement is discussed in connection with the station chains, the negative potential applied to line RL2 at the station resets the entire chain through multiple and cascade action as previously described in connection with the station chain stage shown in FIG. 4.

I shall now describe the operation of the complete system including my invention. The detailed operation of the basic system upon which my invention is based is fully described in the copending application Serial No. 710,718. For this reason it will be described herein only in sufficient detail to understand the purposes and operation of the circuits of my invention.

Referring first to FIG. 1, it was previously discussed that a plurality of control devices CD, one for each control function which it is desired to transmit from the office to the station, are supplied to control the transmission of these functions during each counting cycle of the office transmitting or control counting chain. As each stage of the transmitting chain reverses its condition, as shown in FIG. 3, a negative potential pulse is provided over line SP associated with that stage through capacitor CT, control device CD, and rectifier D2 to selector bus connection S. When control device CD for a particular stage is closed, this negative pulse overrides or opposes the positive pulse applied simultaneously over line ISL to the base of transistor TR12 of the selector network. With this negative potential applied, transistor TR12 becomes conducting and of necessity, because of the cross coupling, transistor TR11 of circuit E–J3 becomes nonconducting. A negative potential is then applied from the midpoint of the resistor divider R31, R32 over line $Lf1$ to transmitter $f1$. This causes a pulse of carrier current of frequency $f1$ to be transmitted from the office shown in FIG. 1 over the communication channel to the station. If the control device CD associated with a particular transmitting stage is open, the negative pulse through capacitor CT does not reach bus connection S and the positive pulse over line ISL is applied to the base of transistor TR12 causing it to become nonconducting. Under these conditions, transistor TR11 of course becomes conducting. The negative potential at the collector of transistor TR12 then changes the potential of the center tap of resistor divider network R33, R34 so that a negative potential is applied over line $Lf2$ to transmitter $f2$ at the office location. This results in the transmission of a carrier current pulse of frequency $f2$ over the communication channel to the station. Each control device CD thus controls the transmission of a first or second condition code for the corresponding control function which it governs. This operation is similar for each stage of the transmitting chain at the office, as illustrated partially in FIG. 3, over the various lines SP designated by suffixes $(X-1)$, X, and $(X+1)$. Only that number of stages of the transmitting chain as are necessary to provide one stage for each control device are used in this manner, the remaining stages being ineffective to cause the transmission of any control function but being necessary to match the number of stages in the receiving chain as indicated in FIG. 1. Pulses of carrier current of frequency $f2$ are automatically transmitted during these unused stages.

At the station location, as shown in FIG. 2, a single counting chain provides in combination both the transmitting and receiving stages with the receiving circuit stages operating alternately with the transmitting circuit stages. It is to be noted that, as shown in the present case, the counting action of transmitting and receiving stages at the station is at twice the selected rate at which either the transmitting or the receiving chain at the office operates. This is obviously necessary in order that the composite chain at the station, with twice as many stages in cascade, may complete its cycle of counting in the same period of time as that in which either chain at the office completes its cycle. Referring to FIG. 4, each receiving circuit stage in the composite stage at the station reverses in its turn as the count is received. Upon the reversal of each receiving stage, a negative pulse is provided over line SPR associated with that stage through capacitor CR to the gate arrangement comprising transistors TR13 and TR14 with their corresponding circuit elements. As previously described, this negative pulse is applied simultaneously through resistors R40 and R41 to the collectors of the two gate transistors. Pulses of carrier current of frequencies $f1$ and $f2$ are received from the office by the carrier receivers at the station shown in FIG. 2, and result in the application of negative potentials over lines $LRf1$ and $LRf2$ to each gating arrangement associated with a registry stage corresponding to each receiving stage. It is to be remembered that the negative potential is applied to the receiving lines $LRf1$, $LRf2$ only when the corresponding receiver is not receiving a pulse of carrier current. The application of a negative potential to either line $LRf1$ or $LRf2$ causes the corresponding transistor TR13 or TR14 to become conducting. The negative scanning pulse appearing at the collector of the conducting gating transistor is conducted to ground line LE and thus is ineffective for any operation. However, the negative pulse at the collector of the nonconducting gating transistor is applied to one of the associated transistors of circuit E–J4 to condition this registry stage accordingly for the function reception.

Taking specific examples of the transmission of control functions, if control device CD associated with a particular office transmitting stage is closed, carrier current of frequency $f1$ is transmitted over the communication channel to the station location where it is received by carrier receiver $f1$. Under these conditions, receiver $f2$ applies a negative potential over receiving line LR$f2$ to the base of gating transistor TR14. The negative pulse emitted by the corresponding receiving circuit stage at the station appearing at the collector of this transistor is then conducted to ground at line LE. However, the negative pulse which appears at the collector of transistor TR13 of the gating circuit is applied to the base of transistor TR15, causing this transistor to conduct and the associated transistor TR16 of circuit E–J4 to become nonconducting. Transistor TR17 likewise is nonconducting under these conditions and relay FS is deenergized since no current flows through the relay winding.

If control device CD at the office is open, carrier current of frequency $f2$ is transmitted so that the negative potential appears on receiving line LR$f1$ and causes gating transistor TR13 to conduct the negative pulse at its collector to ground. The negative pulse at transistor TR14 is applied to the base of transistor TR16 which becomes conducting, transistor TR15 of necessity becoming nonconducting. Transistor TR17 likewise becomes conducting as a result of the conducting condition o ftransistor TR16 and current flows through the winding of relay FS which is thus energized. Reviewing, if a control device CD is closed, the corresponding function stick relay at the station is deenergized, whereas if the control device CD is open, the corresponding relay FS is energized. It should be noted that, if desired, this sequence of operation of the function stick relay at the station may be reversed so that a closed control device causes the energization of the relay.

A similar operation occurs between the transmitting circuit stages of the station counting chain and the stages of the offce receiving chain. At the station, as shown in FIG. 2, and with reference also to FIGS. 3 and 4, if the contact of the indication relay associated with a particular transmitting circuit stage is closed, carrier current of frequency $f3$ is transmitted, as is obvious from a study of FIG. 3, since the station selector circuits are identical. If the indication relay contact is open, carrier current of frequency $f4$ is transmitted. This operation of course is similar to that already described for the transmission of control functions from the office. At the office, the registry stage associated with each receiving counting chain stage operates similar to that shown in FIG. 4, so that it is similar to the registry operation described for the station. If the indication contact at the station associated with a particular stage is closed, the corresponding indication relay K at the office, as shown in FIG. 1, becomes deenergized. If the indication relay contact is open, the corresponding relay K at the office becomes energized. Again, this operation of the relay may be reversed, if desired.

It is obvious from the preceding discussion that the operation of the receiving chains must coincide with the reception of the corresponding functions at that location. In other words, the condition reversal of a particular receiving chain stage must occur at the same time the carrier current pulse indicating the condition of the assigned function is received at that location. It has been determined that the receiving stage reversal should occur about midway during the period that the corresponding function code pulse is being received. The counting operation of each receiving chain must therefore be synchronized with any pulse transmission delay times inherent in the communication channel.

As has been previously indicated, all counting chain cycling operation is controlled by the master stepping generator at the office. As a specific example, the frequency of the output of this master stepping generator is herein chosen to be a multiple of eight times the desired stepping rate of the office chains. This is so selected in order that the operation of the stages of the various receiving chains may be adjusted to occur as near as possible to the midpoint of the reception period for the associated functions at the receiving location. This relatively higher frequency output for the master stepping generator is reduced by the various frequency dividers to drive the counting chains. At the office location, the master stepping generator output is fed directly into both frequency dividers in multiple and in addition into a carrier transmitter $f5$ having an output carrier current of frequency $f5$. The master stepping pulses are thus transmitted by this carrier current over the communication channel to the station location where they are received by carrier receiver $f5$ from which the stepping output is fed into the station frequency divider. It is to be noted that pulses of carrier current of frequency $f5$ are subject to different transmission delay periods than are the pulses of carrier current of frequencies $f1$ and $f2$.

Referring to FIGS. 1 and 7, it is seen that the output pulses of the master stepping generator are fed over stepping line SG and through capacitor C3 into frequency divider No. 1, that is, into the first stage of this arrangement. The operation of this frequency divider is a binary counting action. At the end of every eighth count, that is, every eighth cycle of the master stepping generator output, the fourth stage of the frequency divider chain reverses its condition shifting the negative potential between lines OSP and ESP. As previously mentioned, the operation of this frequency divider chain is continuous once it has been initiated. A negative potential is applied to line OSP at the end of the first count of eight and thereafter at the end of each odd-numbered count of eight. Conversely, the negative potential appears on stepping line ESP at the end of the second count of eight cycles of the master frequency input and at the end of every even-numbered eight count thereafter. These negative potentials are thus applied alternately through capacitors CSP to pulse generators SPG1 and SPG2 of FIG. 7. When a pulse is applied to either of these pulse generators through the associated capacitor CSP, it results in a zero potential interruption of the otherwise positive potential applied to a stepping line connected to the emitter of the second transistor of the pulse generator. In other words, the alternate application of the negative pulses to the pulse generators results in alternate zero pulses over stepping lines SLOC and SLEC to the stages of the office transmitting chain. These stepping pulses of zero potential are applied alternately to the odd and even-numbered stages of this office chain as shown schematically in FIG. 5. In conjunction with the priming action from each stage to its successive stage, these alternate pulses cause the cyclic counting operation of the transmitting chain. This operation cycle repeats continuously with the chains being reset at the end of each counting cycle, as was previously discussed, under control of the reset control apparatus in FIG. 7.

Referring now to FIGS. 2 and 8, the control of the station counting chain may be studied. As is obvious, the master stepping pulses from the master stepping generator are received over carrier circuit $f5$ by receiver $f5$ at the station. From here they are fed over line SGA through capacitor C3 into a frequency divider similar to frequency divider No. 2 shown in FIG. 8. For the station location, the frequency divider arrangement is modified, as previously indicated, by deleting the fourth stage of the arrangement. The stepping lines joining the frequency divider with the pulse generators are then connected to the collectors of transistors 3TR7 and 3TR8 of the third binary stage, as shown in FIG. 2 by conventional dotted lines designated FOSP and FESP. It is obvious that a negative potential will be applied alternately over these two connecting lines but that the frequency at which the potentials are applied will be twice that of the office frequency dividers, that is, at the rate of every fourth cycle of the master stepping generator output. The single combination stage of the station counting chain shown in FIG. 4 illustrates the need for this double-rate control input for the counting action. The alternate negative potentials of lines FOSP and FESP are applied to pulse generators similar to generators SPG1 and SPG2 at the lower left of FIG. 7. The output from these pulse generators at the station is in the form of zero potential interruptions of an otherwise steady positive potential applied over lines FSLC and FSLI, shown in parenthesis in FIG. 7, which are connected to the control and indication circuit stages (the transmitting and receiving circuit stages), respectively, of the station counting chain, as shown in FIGS. 4 and 6. The operation is such that the receiving and transmitting circuit stages of each combination counting stage at the station reverse their condition for each reversal of a transmitting or a receiving stage, respectively, in the office counting chains.

At the end of the first counting cycle of the office transmitting chain, a reset or synchronizing pulse is transmitted over the communication channel under the control of the final or $n$ stage of the transmitting chain. This reset or synchronizing pulse consists of pulses of current of frequencies $f1$ and $f2$ transmitted simultaneously. Referring to FIG. 3, since there are no control devices associated with the final stage of the transmitting chain, the selector automatically causes the transmission of a carrier current pulse of frequency $f2$. As schematically shown in FIG. 1, the reset control unit, over line $Lf1A$, causes the transmission of a carrier current pulse of frequency $f1$ also. The details of the reset control unit, and particularly the source of the negative potential in line $Lf1A$ required for this transmission are shown in FIG. 7. This reset pulse is made ¾ of the length of a normal chain stepping period, and is initiated by the negative potential appearing on line $SP_n$ as a result of the reversal of the final stage of the office transmitting chain. As shown in FIG. 7, this negative potential on line $SP_n$ is applied to the base of transistor TR23 of circuit E–J5 and the resulting condition of this E–J circuit arrangement continues until the application of a negative potential at the base of the other transistor TR24 from the common collector connection of transistors TR21 and TR22 of the No. 1 AND circuit which is also part of the reset control device. This negative potential from the collector of transistor TR24 is also applied over reset line RL1 to reset the office transmitting chain stages as previously described. However, the reset or synchronizing pulse transmitted from the office is subject to the same transmission delays as is each control function pulse. This is true since the same frequency carrier currents are used for both types of pulses. The synchronizing pulse is received at the station and is applied to the synchronizing and reset delay arrangement shown at the bottom of FIG. 2. The circuit arrangement of this delay unit at the station is equivalent to the synchronizing and reset delay arrangement shown at the bottom of FIG. 8 in connection with the office receiving chain. The only exception is that the reset pulse is applied over lines $LRf1$ and $LRf2$ at the station rather than the equivalent lines $LRf3$ and $LRf4$ at the office.

Referring to FIG. 8 and assuming that the delay arrangement is that at the station, simultaneous application of positive potential to lines $LRf1$ and $LRf2$ holds both transistors of the No. 2 AND circuit nonconducting. This creates a negative potential pulse through capacitor C7 into the synchronizing pulse generator No. 1 and results in a similar negative potential pulse transmitted through capacitor C9, line RL3 and rectifier D7A to reset the binary counter stage (at the left of the drawing) to its normal condition with transistor TR7A conducting. At the same time, the negative potential at the common collector connection of transistors TR18 and TR19 builds up a negative potential on the base of transistor TR20 in the phase inverter unit. This build-up is controlled, as previously described, by changing the charge appearing on capacitor C10 and its length is controlled by the setting of resistor R58. After the period of time which is established by resistor R58 and capacitor C10, transistor TR20 becomes conducting and its collector changes from a negative to a positive potential which is applied to the base of transistor TR29. This latter transistor thus becomes nonconducting after the expiration of the selected period of time after the reset pulse is initially received. It is to be noted that, although an overlap of pulses of carrier current of frequencies $f1$ and $f2$ during the normal operation in transmitting control functions may occur to cause a nonconducting condition simultaneously for transistors TR18 and TR19, this condition as a result of the overlap exists for too short a period of time to permit the charge on capacitor C10 to change sufficiently to apply a negative potential which will cause transistor TR20 to become conducting. As soon as the overlap period ends, the positive potential appearing at the lower terminal of resistor R29 is immediately applied through rectifier D8 to the base of transistor TR20 to prevent its changing condition.

As soon as it has been reset to its normal condition, the binary counter stage responds again to the application of pulses at master stepping frequency through capacitor C3A. At the end of two cycles of the master stepping frequency, which corresponds to ¼ of the selected stepping period for the office chains, transistor TR8A becomes nonconducting and a negative pulse is transmitted through capacitor C6A and rectifier D6A to transistor TR27 of the gate arrangement. When transistor TR27 becomes conducting, transistor TR28 of necessity becomes nonconducting through the cross coupling arrangement and a negative potential thus appears on the collector of this latter transistor at the end of two cycles of the master stepping frequency. Since transistor TR29 also becomes nonconducting at this time because of the positive potential from transistor TR20 applied to its base, the common connection of the collectors of transistors TR28 and TR29 assumes a negative potential. If transistor TR29 remains conducting, this negative potential can not occur on the common connection. Thus the existence of the synchronizing or reset condition as transmitted by the office for a minimum of ¼ of the selected stepping period of the counting chains is checked by the synchronizing and reset delay arrangement prior to the application of any synchronizing pulse to the frequency divider.

The negative potential appearing on the collectors of transistors TR28 and TR29 is applied directly through resistor RR2 to reset line RL2 to reset the station counting chain to its normal condition as shown schematically in FIG. 2 and in more detail in FIG. 4 for the single combined stage of this chain. The negative pulse which results in capacitor C11 further results through synchronizing pulse generator No. 2 in a negative pulse from capacitor C12. This is applied to the reset line through the various rectifiers D7 to reset the frequency divider at the station. Referring to FIG. 8, this station frequency divider is represented at the top of the drawing by the elimination of the fourth stage of the arrangement shown. The remaining three stages which are used at the station location are reset with a preselected count of two entered therein. This corresponds, when considering the full count of eight used at the office, to a preselected count of six, transistors TR7, 2TR8 and 3TR8 being conducting after the reset pulse. This resetting or synchronizing pulse is, of course, of relatively short duration and disappears to permit the frequency divider to again follow the master stepping frequency pulses entered therein through capacitor C3.

At the end of two cycles of the master stepping frequency, the third stage of the chain reverses so that transistor 3TR8 becomes nonconducting. This applies a negative potential over line FESP to pulse generator SPG2. This pulse generator in turn provides a stepping pulse over line FSLI, shown in FIG. 7, to the station chain, in particular to the receiving circuit stages thereof. This pulse finds no receiving circuit stage primed for operation, or possibly only the final receiving stage so primed. However, this pulse to the receiving chain occurs four cycles of the master stepping frequency after the reception of a synchronizing pulse from the office. This results in successive receiving stage reversals occurring midway in the function reception period. In other words, the first station transmitting circuit stage count after the reset, which is the first stage, occurs four master stepping cycles after this ineffective receiving stage stepping pulse. Thus the reversal or counting action of the first station transmitting stage coincides with the reversal of the first stage of the office transmitting counting chain, plus the number of cycles of the master stepping frequency equal to the transmission delay time of the control function carrier currents. Since the reversal or count operation of each receiving circuit stage at the station occurs four cycles after the associated transmitting stage reversal, the first receiving stage becomes responsive midway during the reception period of the first stage control function carrier current pulse, allowing for the delay in the transmission of this pulse. Thus the preselected count entered into the frequency divider during its synchronizing and reset action conditions the station location for chain operation so that receiving stage circuits are responsive at approximately the midpoint in the period of reception of the corresponding functions from the office. This assures proper reception of the control functions and eliminates the effect of minor differences in the actual values of the various circuit elements in the equipment.

The synchronizing action between the station transmitting stages and the office receiving chain is similar to that already described. In FIG. 2, a connection L*f*3A between the station reset control device and the carrier transmitters controls the transmission of the reset and synchronizing pulse during which current pulses of both frequencies *f*3 and *f*4 are transmitted. The station reset control device is similar to that shown in FIG. 7 for the office transmitting chain. At the station, however, no reset line equivalent to RL1 is necessary or useable since the station chain must be reset at the end of the synchronizing action just described above. However, line L*f*3A is the equivalent of line L*f*1A shown in FIG. 7. This reset control device at the station is triggered by a pulse from the final transmitting stage over line SP$_n$ into circuit E–J5. As already described, the reset and synchronizing pulse transmission is provided with a length which is ¾ of the period of a full counting step. A study of the connections shown in FIG. 7 together with the previous description is sufficient for an understanding of the transmission from the station of the synchronizing pulse including carrier currents *f*3 and *f*4.

Referring again to FIG. 8, frequency divider No. 2, complete as shown, is associated with the office receiving chain. The operation of this arrangement has been previously described and it will be noted that the output of the frequency divider is alternately applied over lines 2OSP and 2ESP to the pulse generators associated with this divider. These are identical with the two pulse generators SPG1 and SPG2 shown at the lower left of FIG. 7 in connection with the transmitting chain. When considered in connection with the office receiving chain, the stepping pulses are applied over stepping lines SLOI and SLEI to alternate stages of the receiving chain to drive the chain throughout its counting cycle. It is thus obvious that this chain is controlled in its counting operation independent from the associated transmitting chain at the office.

When the office receives the synchronizing and reset pulse transmitted by the station, a positive potential is applied over receiving lines LR*f*3 and LR*f*4 simultaneously. This causes the appearance of a negative potential at the connected collectors of the two transistors of the No. 2 AND circuit. This negative potential is transmitted through capacitor C7 to the synchronizing pulse generator No. 1 and thence through capacitor C9 over line LR3 to reset the binary counter stage of the synchronizing and reset delay arrangement. The negative potential at the collectors of the AND circuit transistors also causes a change in the charge on capacitor C10. This change occurs at the end of a selected period of time to provide a negative potential on the base of transistor TR20 to cause this transistor to become conducting. Transistor TR20 then applies a zero potential from its collector to the base of transistor TR29 at the end of this delay period to cause this latter transistor to become nonconducting. This action can occur only if the synchonizing pulse of carrier current of frequencies *f*3 and *f*4 has a greater length than ¼ of a chain stepping period, or in other words, exceeds two cycles of the master stepping frequency. The binary counter stage, immediately upon resetting, marks two cycles of the master stepping frequency and then transmits a negative potential pulse through capacitor C6A to transistor TR27 which becomes conducting. Transistors TR28 and TR29 are thus simultaneously nonconducting, if the reset pulse is of sufficient duration, and their connected collectors attain a negative potential. This negative potential is applied directly to reset line RL2 to reset the various stages of the receiving counting chain. In addition, a negative pulse is transmitted through capacitor C11 to synchronizing pulse generator No. 2 which, as a result, emits a negative potential pulse through capacitor C12 to the reset arrangement for the frequency divider. As previously described, the resetting arrangement for the frequency divider counting stages enters a pre-selected count of six into this divider unit. This count appears with transistors TR7, 2TR8, 3TR8 and 4TR8 being in the conducting condition due to the effect of the reset pulse from capacitor C12. Since the binary counter stage of the synchronizing and reset delay arrangement continues to follow the master stepping pulses applied to capacitor C3A, the gating arrangement immediately cuts off the negative potential at the collectors of transistors TR28 and TR29 to halt the reset pulse to the receiving chain stages and to the synchronizing pulse generator.

When the first stage of the frequency divider has marked off two additional cycles of the master stepping frequency, the fourth stage of the frequency divider reverses its condition so that transistor 4TR8 becomes nonconducting. This reversal is the result of the preselected count entered into the frequency divider by the reset pulse. A negative potential is thus applied over line 2ESP to pulse generator SPG2. This results in a stepping pulse output from the generator, shown in FIG. 7, over stepping line SLEI. However, this pulse, which is applied to the even-numbered stages of the receiving counting chain, is ineffective since no even-numbered stage is primed for response at this time, the reset pulse previously transmitted over line RL2 having reset all stages to their normal condition. Thus only the first stage of the chain is primed for operation. This stepping pulse occurs four master stepping cycles, plus whatever transmission delay time is involved in the communication channel, after the transmission of the synchronizing pulse from the station. Said in another way, this stepping pulse occurs four master stepping cycles after the reception of the synchronizing pulse at the office. The next reversal of the fourth stage of frequency divider No. 2 occurs eight master stepping cycles later after a complete cycle of operation of the frequency divider. At this time, transistor 4TR7 becomes nonconducting and a negative potential is applied from its collector over line 2OSP and through capacitor CSP, in FIG. 7, to pulse generator SPG1. The resulting stepping pulse over line SLOI is supplied to the odd-numbered stages of the receiving chain and the first stage, having been reset and thus primed for operation, reverses its condition, as described previously in connection with the details of FIG. 3. It will be obvious that the reversal or counting action of this first receiving stage occurs four master stepping cycles, plus the transmission delay period after the first transmitting circuit stage of the station chain has reversed its condition. Again, said in another manner, the reversal of the first stage of the office receiving chain occurs four master stepping cycles after the reception of the first indication function pulse from the station begins. Thus the instant at which the first receiving and registry stages of the office receiving chain are responsive to the reception of the indication function occurs at a point approximately midway during the period of the reception of this first indication pulse. This assures that the pulse of carrier current which indicates the condition being indicated will be received at the office prior to the instant of response of the first receiving stage and registery of the indication is assured. The reversal of each succeeding stage of the office receiving chain occurs at a similar point during the reception of the corresponding indication pulse.

The system involving the circuits of my invention thus provides for the compensation of transmission delay periods inherent in any communication channel in which relatively high frequency carrier currents are used. The conditioning and resetting of the various counting chains as a result of the transmission of synchronizing pulses from the transmitting chain provides that the counting operations will begin only at a time which compensates for the delay in the transmission of the functions between the locations. In addition, the preselected conditioning of the frequency dividers at the synchronizing period assures that the instant at which the receiving stages are responsive to the reception of a function carrier pulse occurs at a point approximately midway during the reception period of this function carrier pulse at the receiving location. This assures that the function transmission will be received and properly registered.

Although I have herein shown and described but one form of continuously scanning remote control system involving the circuits of my invention, it is to be understood that various modifications and changes may be made within the scope of the appended claims without departing from the spirit and scope of my invention.

Having thus described my invention, what I claim is:

1. In a remote control system including a control office location and at least one remote station location connected by a communication channel, each location being provided with code transmitting and receiving apparatus controlled by counting chain arrangements adapted to be driven through similar sequential cycles of operation by the application of stepping pulses thereto, said transmitting and receiving apparatus being connected to said channel for the transmission and reception of code functions in each direction between said control and said remote locations, the combination comprising, a master pulse generator for generating a continuous sequence of pulses at a preselected frequency, stepping pulse generating means at each location controlled by said master pulse generator for generating a series of stepping pulses at a predetermined sub-multiple of said preselected frequency and having connections for supplying said stepping pulses to drive the associated counting chains through continuously recurring cycles of operation, a reset control means associated with each code transmitting apparatus and controlled by the corresponding counting chain for transmitting a unique reset pulse to the other location at the end of each cycle of operation of said corresponding counting chain arrangement, and synchronizing means associated with each code receiving apparatus and responsive to the reception of the reset pulse from the other location for shifting the phase of the next cycle of operation of the counting chain arrangement associated with that code receiving apparatus in comparison with the next cycle of operation of the counting chain arrangement associated with the other location code transmitting apparatus to compensate for the transmission delay times of said code functions over said communication channel.

2. A remote control system including a first and a second location connected by a communication channel, comprising in combination, a transmitting means at said first location for transmitting information functions over said channel, a receiving means at said second location for receiving said functions from said channel, a counting chain means at each location operable at a selected pulse rate in continuously recurring cycles for controlling the associated transmitting and receiving means on each count to transmit and receive respectively a series of different functions during each cycle of operation, a master pulse generator at said first location for generating a continuous output of pulses having a frequency which is a predetermined multiple of said selected pulse rate, another transmitting means at said first location having connections to said master generator for transmitting the master pulses to said second location, a stepping pulse generating means at each location controlled by said master pulse generator for supplying stepping pulses at said selected pulse rate, each said stepping pulse means having connections to the corresponding counting chain means for advancing the counting operation through the cycle, and synchronizing means at said second location controlled jointly by said master pulse generator and by said first location counting chain means during the last pulse of each cycle of operation for adjusting the initiation of a new cycle of operation of said second location counting chain means to compensate for pulse transmission delay times of said communication channel.

3. A remote control system including a first and a second location connected by a communication channel, comprising in combination, a transmission circuit means having connections through said channel for transmitting information functions from said first location for registry at said second location, a counting chain means at each location operable at a selected pulse rate in continuously recurring cycles for controlling said transmission circuit means to transmit and register a different one of a plurality of information functions during each count of a cycle of operation, a master pulse generator for generating a continuous output of pulses at a frequency which is a predetermined multiple of said selected pulse rate, a stepping pulse generating means at each location controlled by said master pulse generator for supplying stepping pulses at said selected rate, each said stepping pulse generating means having connections to the corresponding counting chain means for advancing its counting operation through the cycle, reset control means at said first location operably connected to the corresponding counting chain means for providing a unique reset pulse during the final pulse of each counting cycle to reset that chain to initiate a new cycle of operation, said reset means having connections to said transmitting circuit means for transmitting said reset pulse to said second location, and synchronizing means at said second location having connections for receiving said reset pulse and controlled jointly by the reception of said reset pulse and by said master pulse generator for resetting the second location counting chain means and for adjusting the operation of the second location stepping pulse generating means to compensate for pulse transmission delay times of said communication channel prior to effecting the initiation of a new cycle of operation of said second location counting chain means.

4. A remote control system including a first and a second location connected by a communication channel, comprising in combination, a transmission circuit means having connections through said channel for transmitting information functions from said first location for registry at said second location, a counting chain means at each location operable at a selected pulse rate in continuously recurring cycles for controlling said transmission circuit means to transmit and register a different one of a plurality of information functions during each count of a cycle of operation, a master pulse generator for generating a continuous output of pulses at a frequency which is a predetermined multiple of said selected pulse rate, a frequency dividing means at each location operably connected to said master pulse generator for periodically supplying an output pulse for each group of master pulses equal in number to said predetermined multiple, a pulsing circuit means connecting said frequency divider means and said counting chain means at each location for driving said chain means through its cycle of operation at the rate of said output pulses, a reset control means at said first location operably connected to the corresponding counting chain means for providing a unique reset pulse during the final count of each counting cycle to reset that chain to initiate a new cycle of operation, said reset control means also having connections to said transmitting circuit means for transmitting said reset pulse to said second location, and synchronizing means at said second location responsive to the reception of said reset pulse for resetting the second location counting chain means and for phasing the next response of the associated frequency divider to said master pulse generator to initiate a new cycle of operation of said second location counting chain means at a time interval which compensates for pulse transmission delay periods over said communication channel.

5. A remote control system including a first and a second location connected by a communication channel, comprising in combination, a transmission circuit means having connections through said channel for transmitting information functions from said first location for registry at said second location, a counting chain means at each location operable at a selected pulse rate in continuously recurring cycles for controlling said transmission circuit means to transmit and register a different one of a plurality of information functions during each count of a cycle of operation, a master pulse generator for generating a continuous output of pulses at a frequency which is a predetermined multiple of said selected pulse rate, a frequency divider means at each location operably connected to said master pulse generator for counting the output pulses of said master pulse generator and for providing a periodic output pulse when the total count equals said predetermined multiple, a stepping pulse generating means at each location means having connections to the associated counting chain means and controlled by the corresponding frequency divider means for supplying a stepping pulse to said associated counting chain means for each output pulse of said corresponding frequency divider, a reset control means at said first location operably connected to the corresponding counting chain means for providing a unique reset pulse during the final count of each counting cycle to reset that chain to initiate a new cycle of operation, said reset control means also having connections to said transmitting circuit means for transmitting said reset pulse to said second location, and synchronizing means at said second location responsive to the reception of said reset pulse for resetting the second location counting chain means and for entering a preselected partial count into the associated frequency divider to condition that frequency divider for initiating a new cycle of operation of the second location counting chain means properly phased to compensate for the function transmission delay time of said communication channel.

6. In a remote control system including an office and at least one station location connected by a communication channel, the combination comprising, a first stepping means at said office operable through a counting cycle comprising a predetermined number of steps, a transmitter means at said office controlled by said first stepping means and having connections to said channel for transmitting in succession a plurality of functions, a second stepping means at said station also operable through a counting cycle comprising said predetermined number of steps, a registry means at said station controlled by said second stepping means and responsive to the transmissions from said office for successively registering the plurality of transmitted functions, a source of master stepping pulses of a selected frequency, a frequency divider at each location having separate connections to said source and operable to count the master stepping pulses, each frequency divider having connections for supplying stepping pulses at a selected rate lower than said selected frequency to operate the associated stepping means through its counting cycle, a reset means at said first location connected to said first stepping means and to said transmitter means and controlled by the final portion of said first stepping means for supplying a distinctive reset pulse to each location, said first stepping means being responsive to the corresponding reset pulse to initiate a new counting cycle, and a synchronizing means at said station responsive to the corresponding reset pulse and having connections for resetting said second stepping means to its initial position and for entering a preselected partial count into the associated frequency divider to compensate for the transmission delay time of said functions prior to the initiation of the subsequent counting cycle of said second stepping means.

7. In a remote control system including a control office and at least one station connected by a communication channel, the combination comprising, a master generator for supplying pulses of a selected frequency and having connections for transmitting said pulses to said station by a first carrier circuit in said channel, a counting chain at said office and at said station each operable through a predetermined stepping cycle, a stepping pulse generator at each location responsive to said master generator pulses for producing stepping pulses of a predetermined sub-multiple of said selected frequency and having connections for supplying the stepping pulses to drive the associated counting chain through its cycle, transmitting means at said office controlled by the corresponding counting chain and having connections for transmitting a variable function over other carrier circuits in said channel during each step of the chain cycle, receiving means at said station controlled by the corresponding counting chain for registering said variable functions received over said other carrier circuits, a reset means at said office controlled by the corresponding counting chain and having connections for simultaneously transmitting a reset pulse over all said other carrier circuits during the final step of the chain cycle and for resetting the corresponding counting chain to initiate a successive cycle of operation, and a synchronizing means at said station having connections to said channel and responsive to said reset pulse for resetting the corresponding counting chain and for preconditioning the station stepping pulse generator to initiate the successive stepping cycle of the station counting chain only after a delay period which compensates for the transmission delay time of said other carrier circuits.

8. In a remote control system including a control office and at least one remote station connected by a communication channel, the combination comprising, a first and a second counting chain at each location each operable through a predetermined stepping cycle, a master generator for supplying pulses at a selected rate, a first carrier frequency circuit controlled by said master generator for transmitting said pulses over said channel, a stepping pulse generating means for each office counting chain controlled by said master generator for producing stepping pulses at a predetermined sub-multiple rate of said selected rate and having connections for stepping the associated chain through its cycle, a stepping pulse generating means at said station having connections to said channel and responsive to pulses of said first carrier frequency for producing stepping pulses at said sub-multiple rate and having other connections for stepping the station counting chains through their cycles, an office transmitter means controlled by the corresponding first chain for transmitting a plurality of two-condition functions over a second and a third carrier frequency circuit, one function during each step of the corresponding chain cycle, a station transmitter means controlled by the corresponding first chain for transmitting another plurality of two-condition functions by a fourth and a fifth carrier frequency circuit over said channel, one function during each step of the corresponding chain cycle, receiver means at each location controlled by the corresponding second chain for registering the two-condition functions transmitted from the other location, a reset means at each location controlled by the corresponding first chain and having connections for transmitting a reset pulse over both function carrier circuits to the other location, the office reset means having other connections to the corresponding first chain for resetting that chain to initiate a successive cycle of operation, synchronizing means at said station responsive only to the reset pulse from said office for resetting the station chains to prepare for a successive cycle of operation and for preconditioning the station stepping pulse generating means to initiate the successive cycle of said station chains only after a time interval equal to the transmission delay time of said second and third carrier circuits, and another synchronizing means at said office responsive only to the reset pulse from said station for resetting the second chain and for preconditioning the corresponding office stepping pulse generating means to initiate a successive cycle of said second office chain only after a time interval equal to the transmission delay time of said second, third, fourth, and fifth carrier circuits.

References Cited in the file of this patent

UNITED STATES PATENTS

| | | |
|---|---|---|
| 2,584,739 | Rees et al. | Feb. 5, 1952 |
| 2,629,088 | Kendall | Feb. 17, 1953 |
| 2,649,580 | Dunn | Aug. 18, 1953 |
| 2,794,179 | Sibley | May 28, 1957 |